US010541389B2

(12) United States Patent
Ue et al.

(10) Patent No.: US 10,541,389 B2
(45) Date of Patent: Jan. 21, 2020

(54) BATTERY, BATTERY PACK, ELECTRONIC DEVICE, ELECTRIC VEHICLE, ELECTRIC STORAGE DEVICE AND ELECTRIC POWER SYSTEM

(71) Applicant: MURATA MANUFACTURING CO., LTD., Kyoto (JP)

(72) Inventors: Mitsuhiro Ue, Kyoto (JP); Yoshihiro Dokko, Kyoto (JP); Takaaki Matsui, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 20 days.

(21) Appl. No.: 15/956,402

(22) Filed: Apr. 18, 2018

(65) Prior Publication Data

US 2018/0241012 A1 Aug. 23, 2018

Related U.S. Application Data

(63) Continuation of application No. PCT/JP2016/004559, filed on Oct. 13, 2016.

(30) Foreign Application Priority Data

Nov. 2, 2015 (JP) .................................. 2015-215748

(51) Int. Cl.
*H01M 2/00* (2006.01)
*H01M 2/02* (2006.01)
(Continued)

(52) U.S. Cl.
CPC ............ *H01M 2/024* (2013.01); *H01M 2/022* (2013.01); *H01M 2/12* (2013.01); *H01M 2/1235* (2013.01);
(Continued)

(58) Field of Classification Search
CPC ............... H01M 2/022; H01M 2/1235; H01M 2220/30; H01M 2/12; H01M 4/525; H01M 2220/20; Y02E 60/122
See application file for complete search history.

(56) References Cited

U.S. PATENT DOCUMENTS

2003/0215700 A1* 11/2003 Hosoda ................... H01M 2/12
429/94
2008/0026286 A1* 1/2008 Cui ..................... H01M 2/0235
429/161
(Continued)

FOREIGN PATENT DOCUMENTS

JP H06-033354 B2 5/1994
JP H09-320549 A 12/1997
(Continued)

OTHER PUBLICATIONS

Japanese Office Action dated Sep. 11, 2018 in corresponding Japanese Application No. 2015-215748.
(Continued)

*Primary Examiner* — Cynthia H Kelly
*Assistant Examiner* — Monique M Wills
(74) *Attorney, Agent, or Firm* — K&L Gates LLP

(57) ABSTRACT

A battery is provided. The battery includes a power generation element having a through hole; and a cylindrical can housing the power generation element and having at least one thin wall part on a circumferential surface of the cylindrical can. A ratio of a hole diameter of the through hole to an outer diameter of the power generation element is 17% or less. The thin wall part is provided in one or both of regions in a range from 0% to 30% and a range from 70% to 100% from one end of the circumferential surface.

20 Claims, 12 Drawing Sheets

(51) Int. Cl.
  *H01M 4/505* (2010.01)
  *H01M 4/525* (2010.01)
  *H01M 10/0587* (2010.01)
  *H01M 2/12* (2006.01)
  *H01M 10/0525* (2010.01)
  *H01M 4/02* (2006.01)

(52) U.S. Cl.
  CPC ........... *H01M 4/505* (2013.01); *H01M 4/525* (2013.01); *H01M 10/0525* (2013.01); *H01M 10/0587* (2013.01); *H01M 2004/028* (2013.01); *H01M 2220/20* (2013.01); *H01M 2220/30* (2013.01); *Y02E 60/122* (2013.01)

(56) References Cited

U.S. PATENT DOCUMENTS

2009/0305114 A1  12/2009  Kwangsoo
2010/0310925 A1*  12/2010  Lee .................... H01M 2/18
                                                            429/164
2013/0234721 A1*  9/2013  Nakamura ............ H01M 2/105
                                                            324/434

FOREIGN PATENT DOCUMENTS

| JP | H10-269997 A | 10/1998 |
| JP | 2000-182588 A | 6/2000 |
| JP | 2003-308873 A | 10/2003 |
| JP | 2009-117749 A | 5/2009 |
| JP | 2009-295576 A | 12/2009 |
| JP | 2011-204726 A | 10/2011 |
| JP | 2015-156307 A | 8/2015 |

OTHER PUBLICATIONS

International Search Report and Written Opinion issued in connection with International Patent Application No. PCT/JP2016/004559, dated Jan. 10, 2017. (9 pages).

* cited by examiner

BATTERY, BATTERY PACK, ELECTRONIC DEVICE, ELECTRIC VEHICLE, ELECTRIC STORAGE DEVICE AND ELECTRIC POWER SYSTEM

CROSS REFERENCE TO RELATED APPLICATIONS

The present application is a continuation of PCT patent application no. PCT/JP2016/004559, filed Oct. 13, 2016, which claims priority to Japanese patent application no. JP2015-215748 filed on Nov. 2, 2015, the entire contents of which are being incorporated herein by reference.

BACKGROUND

The present technology generally relates to a battery, a battery pack, an electronic device, an electric vehicle, an electric storage device, and an electric power system.

Batteries such as lithium ion batteries, when abnormal use outside the ordinary use range is made, a large amount of gas may be produced and the batteries may explode. Therefore, a technology has been proposed in which a safety valve is provided on a top side (sealing portion side) of a battery, a gas is guided from a bottom side (can bottom side) to the top side of the battery via hollow pore portions of a power generation element to rupture the safety valve, or the like, and the gas is discharged from the top side of the battery to suppress explosion of the battery due to rise in internal pressure.

However, in order to respond to the demand for higher capacity of batteries in recent years, it is necessary to make the pore portions of the power generation element small, and the function of the pore portions as a guide path guiding the gas to the safety valve may become insufficient.

SUMMARY

The present technology generally relates to a battery, a battery pack, an electronic device, an electric vehicle, an electric storage device, and an electric power system.

According to an embodiment, a battery is provided. The battery includes a power generation element having a through hole, and a cylindrical can housing the power generation element and having at least one thin wall part on a circumferential surface of the cylindrical can, in which a ratio of an average hole diameter of the through hole to an average outside diameter of the power generation element is 17% or less, and the thin wall part is provided in one or both of regions in a range from 0% to 30% and a range from 70% to 100% from an end of the circumferential surface.

According to another embodiment, a battery pack is provided. The battery pack includes the battery as described herein and a control circuit configured to control the battery.

In a further embodiment, an electronic device is provided. The electronic device includes the battery as described herein, in which the electronic device is configured to receive supply of electric power from the battery.

According to another embodiment, an electric vehicle is provided. The electric vehicle includes the battery as described herein, a conversion device that receives supply of electric power from the battery and converts the electric power into a driving force of a vehicle, and a control circuit that performs information processing on vehicle control based on information on the battery.

According to the present technology in an embodiment, an electric storage device is provided. The electric storage device includes the battery as described herein, in which the electric storage device is configured to supply electric power to an electronic device connected to the battery.

In another embodiment, an electric power system is provided. The electric power system includes the battery as described herein, in which the electric power system is configured to receive supply of electric power from the battery.

According to the present technology in an embodiment, the safety of a battery, a battery pack, an electronic device, an electric vehicle, an electric storage device, and an electric power system can be improved. It should be understood that the present technology is not limited to enhancing safety and that other suitable properties relating to the present technology may be realized and as further described herein.

DETAILED DESCRIPTION

Figure 1:
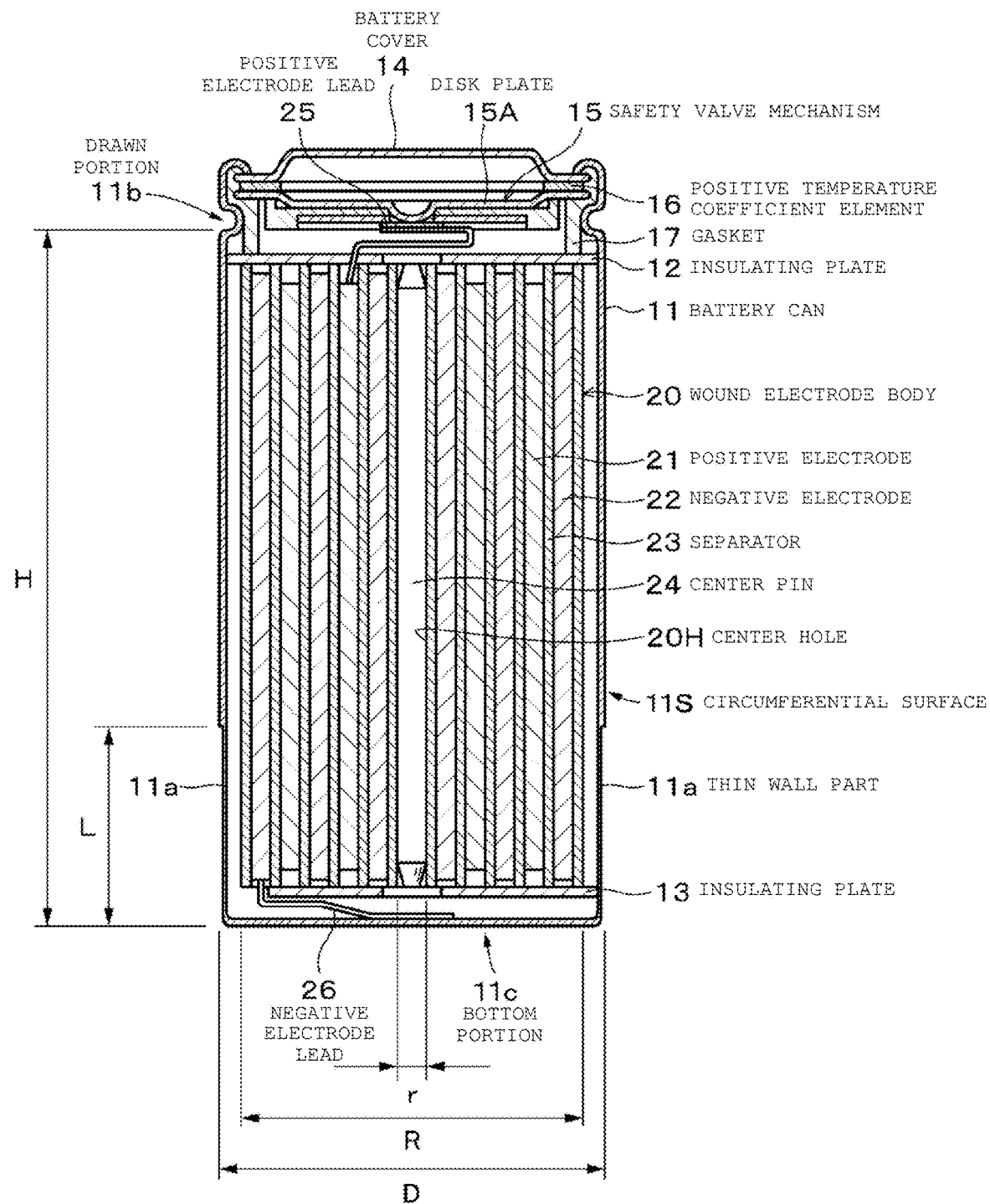
FIG. 1 is a cross-sectional view showing one configuration example of a nonaqueous electrolyte secondary battery according to an embodiment of the present technology.

The present disclosure generally relates to a battery, a battery pack, an electronic device, an electric vehicle, an electric storage device, and an electric power system. As described herein, one configuration example of a nonaqueous electrolyte secondary battery (hereinafter simply referred to as "battery") according to an embodiment will be described with reference to FIG. 1. This battery is, for example, a so-called lithium ion secondary battery in which the capacity of a negative electrode is expressed by the capacity component based on storing and releasing of lithium (Li) serving as an electrode reactant. The battery is a so-called cylindrical type, and includes, in a substantially hollow cylindrical battery can 11, a wound electrode body 20 as a battery element in which a pair of band-shaped positive electrodes 21 and a band-shaped negative electrode 22 are laminated with a separator 23 interposed therebetween, and wound. The battery can 11 include iron (Fe) plated with nickel (Ni), and one end thereof is closed and the other end thereof is opened. An electrolytic solution as an electrolyte is injected into the battery can 11, and the positive electrode 21, the negative electrode 22, and the separator 23 are impregnated with the electrolytic solution. A pair of insulating plates 12, 13 are disposed perpendicularly to the circumferential surface of a wound body so as to sandwich the wound electrode body 20. In the following description, of both ends of the battery, the closed end side of the battery can 11 may be referred to as "bottom side", and the open end side of the battery can 11 on the opposite side may be referred to as "top side".

A battery cover 14, a safety valve mechanism 15 provided inside the battery cover 14, and a positive temperature coefficient element (PTC element) 16 are attached to the open end of the battery can 11 by being caulked with a sealing gasket 17. As a result, the inside of the battery can 11 is hermetically sealed. The battery cover 14 includes, for example, the same material as the battery can 11. The safety valve mechanism 15 ruptures or the like, for example, when a gas is produced inside the battery can 11 at the time of abnormality, and discharges the gas from the top side of the battery. In addition, the safety valve mechanism 15 is electrically connected to the battery cover 14, and configured such that a disk plate 15A is inverted to cut electrical connection between the battery cover 14 and the wound electrode body 20 when the internal pressure of the battery becomes equal to or higher than a certain level due to internal short-circuit, heating from the outside or the like.

The sealing gasket 17 includes, for example, an insulating material, and its surface is coated with asphalt according to an embodiment of the present technology.

The wound electrode body 20 has a substantially cylindrical shape. The wound electrode body 20 has a center hole (through hole) 20H penetrating from the center of the one end face toward the center of the other end face. A center pin 24 is inserted in the center hole 20H. The center pin 24 has a tubular shape with both ends open. Therefore, when a gas is produced in the battery can 11, the center pin 24 functions as a flow path that guides the gas from the bottom side to the top side.

A positive electrode lead 25 made of aluminum (Al) or the like is connected to the positive electrode 21 of the wound electrode body 20, and a negative electrode lead 26 made of nickel or the like is connected to the negative electrode 22. The positive electrode lead 25 is welded to the safety valve mechanism 15 so as to be electrically connected to the battery cover 14, and the negative electrode lead 26 is welded to the battery can 11 so as to be electrically connected to the battery can 11.

In the battery according to an embodiment, an open circuit voltage (that is, battery voltage) in the fully charged state per pair of the positive electrode 21 and the negative electrode 22 may be 4.2 V or less. In another embodiment, the fully charged state per pair of the positive electrode 21 and the negative electrode 22 may be designed to be higher than 4.2 V, preferably in a range of 4.4 V or more and 6.0 V or less, and more preferably in a range of 4.4 V or more and 5.0 V or less. By increasing the battery voltage, a high energy density can be achieved.

Hereinafter, the battery can 11, the positive electrode 21, the negative electrode 22, the separator 23, and the electrolytic solution, which constitute the battery according to an embodiment, will be sequentially described.

Figure 2A:
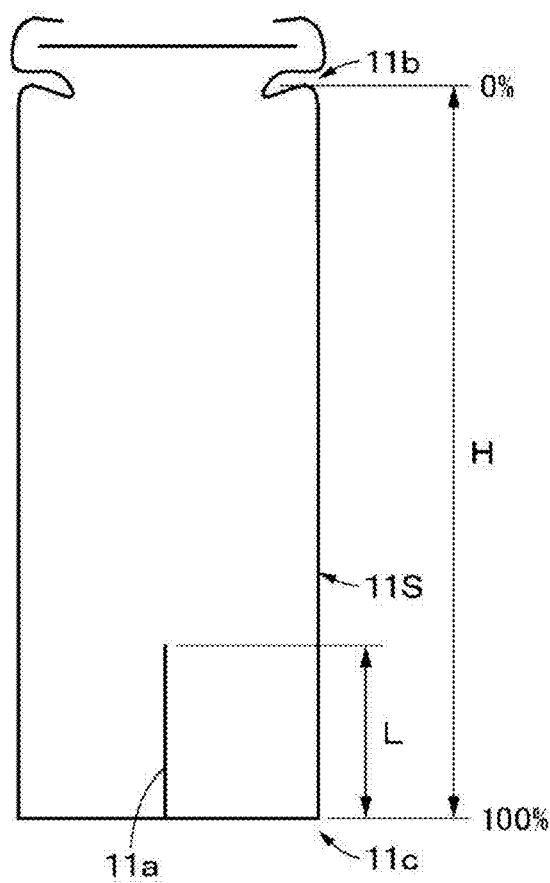
FIG. 2A is a schematic view for explaining a range of a circumferential surface of a battery can according to an embodiment.
Figure 2B:
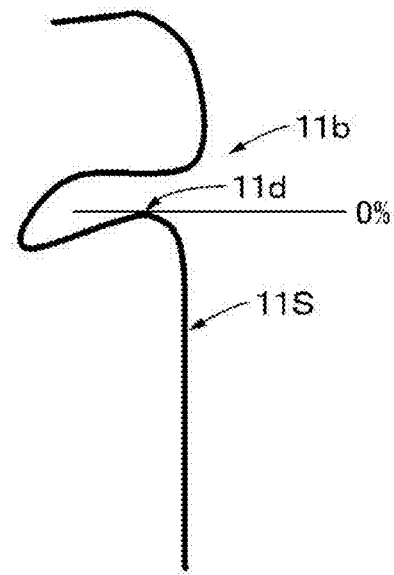
FIG. 2B is an enlarged schematic view of the drawn portion shown in FIG. 2A.

In an embodiment, the battery can 11 is a cylindrical can having at least one thin wall part 11a on a circumferential surface 11S. A drawn portion 11b is provided near the end portion on the top side of the side surface of the battery can 11. Here, as shown in FIG. 2A, the circumferential surface 11S is a surface located between the drawn portion 11b and a bottom portion 11c of the battery can 11. Further, the position in the height direction (width direction) of the circumferential surface 11S is expressed by a percentage in which the position of one end on the top side of the circumferential surface 11S is expressed by "0%" and the position of the other end on the bottom side is expressed by "100%". Note that the position of one end on the top side, which is expressed by "0%", is specifically a position 11d most protruding toward the top side of the drawn portion 11b of the battery can 11, as shown in FIG. 2B.

The circumferential surface 11S of the battery can 11 on which the thin wall part 11a is provided is one or both of the inner circumferential surface and the outer circumferential surface of the battery can 11. The thin wall part 11a is provided in one or both of regions ranging in a range of 0% or more and 30% or less and a range of 70% or more and 100% or less from one end on the top side of the circumferential surface 11S. By providing the thin wall part 11a within this range, it is possible to suppress tear of the thin wall part 11a even when charge-discharge cycle is repeated many times.

Figure 10A:
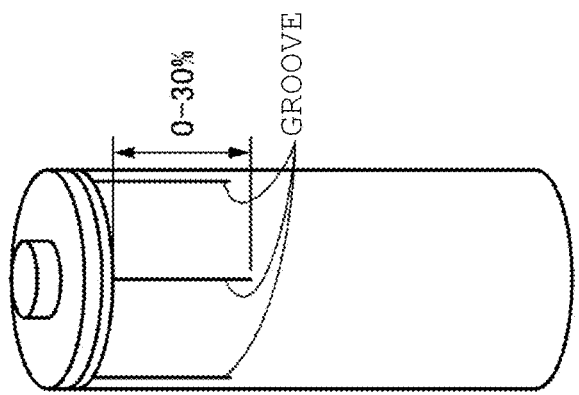
FIGS. 10A, 10B, 10C and 10D are each a schematic view for explaining formation positions of grooves with respect to the circumferential surface according to an embodiment.
Figure 10B:
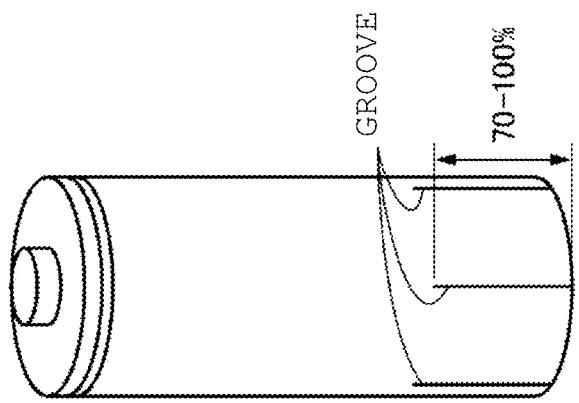
Figure 11A:
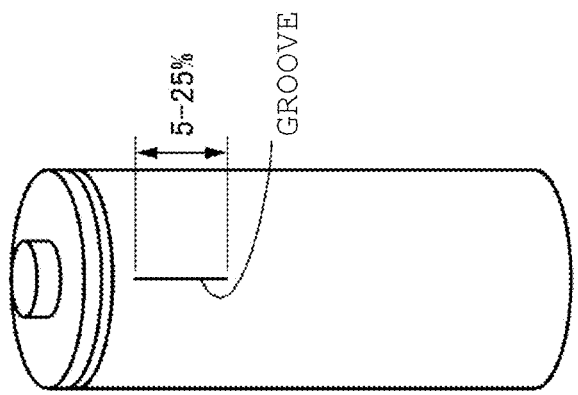
FIGS. 11A, 11B, 11C and 11D are each a schematic view for explaining formation positions of grooves with respect to the circumferential surface according to an embodiment.
Figure 11B:
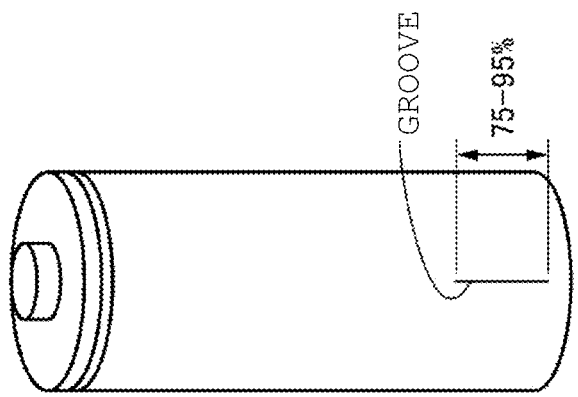

In an embodiment, the thin wall part 11a may be provided in one of regions in a range of 0% or more and 30% or less and a range of 70% or more and 100% or less from one end on the top side of the circumferential surface 11S (see FIGS. 10A and 10B), or may be provided in both of regions in another embodiment (see FIGS. 11A and 11B). In this case, the thin wall parts 11a provided in both ranges may be positioned in the same straight line extending in the height direction of the battery can 11 (see FIG. 11A), or may be displaced with respect to each other in a circumferential direction of the battery can 11 without being positioned in the same straight line (see FIG. 11B).

The number of the thin wall parts 11a provided in the range of 0% or more and 30% or less and the range of 70% or more and 100% or less from one end on the top side of the outer circumferential surface 11S is not limited to one, and may be two or more (FIG. 10C, FIG. 10D) in an embodiment. Further, the thin wall part 11a may not be disposed over the entire region of 0% or more and 30% or less from one end on the top side of the circumferential surface 11S (see FIGS. 11D and 12B) or may not be disposed over the entire region of 70% or more and 100% or less from one end on the top side of the circumferential surface 11S (see FIGS. 11C and 12A) in another embodiment.

In an embodiment, one or both of the regions in the range of 0% or more and 30% or less and the range of 70% or more and 100% less from one end on the top side of the circumferential surface 11S include two or more thin wall parts 11a because the safety of the battery can be further improved.

In an embodiment, one or both of the regions in the range of 0% or more and 30% or less and the range of 70% or more and 100% or less from one end on the top side of the circumferential surface 11S include three or more thin wall parts 11a, and these three or more thin wall parts 11a are disposed at equal intervals in the circumferential direction of the circumferential surface 11S because the safety of the battery can be further improved. In the case where three or more thin wall parts 11a are included as described above, an angle between line segments connecting the thin wall parts 11a adjacent to each other and the center axis of the battery can 11 is preferably in a range of 110° or more and 120° or less.

In an embodiment, a ratio ((L/H)×100) of a length L of the thin wall part 11a to a height (width) H of the circumferential surface 11S is preferably 5% or more and 30% or less. When the ratio is within this range, even when a battery in an overcharged state is accidentally dropped into fire, the contents of the battery can be further prevented from splashing out.

The ratio of the length L of the thin wall part 11a to the height H of the circumferential surface 11S is determined as follows. First, the height H of the circumferential surface 11S and the length L of the thin wall part 11a are determined with a measuring microscope (tool maker's microscope). Next, using the obtained height H and length L, the ratio of the length L to the height H is obtained in terms of percentage ((L/H)×100).

Figure 3A:
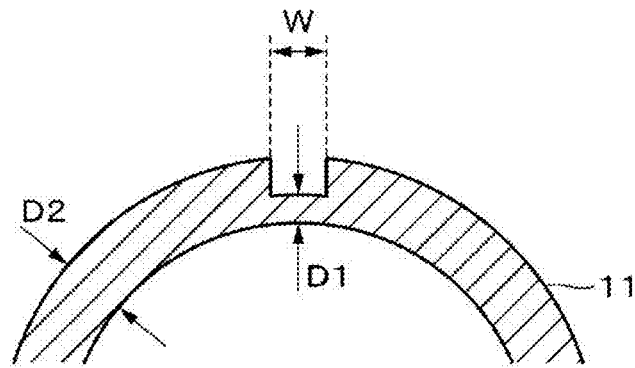
FIGS. 3A, 3B, and 3C are each a schematic view for explaining an example of a shape of a thin wall part according to an embodiment.
Figure 3B:
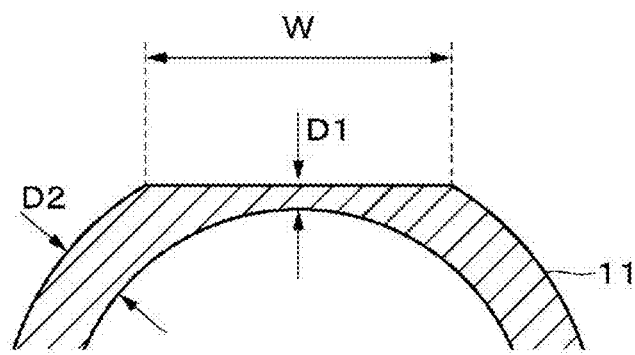
Figure 3C:
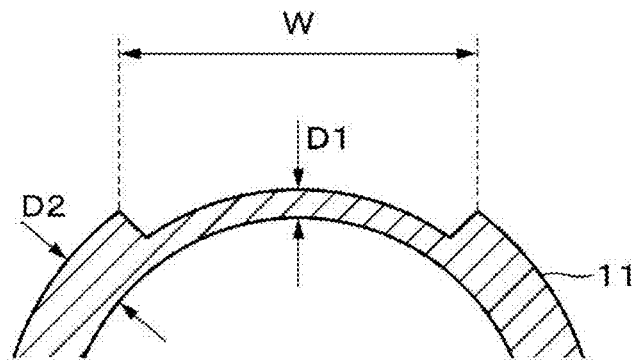

A thickness D1 of the portion of the circumferential surface 11S where the thin wall part 11a is provided (hereinafter simply referred to as "thickness of the thin wall part 11a") is smaller than a thickness D2 of the portion of the circumferential surface 11S where the thin wall part 11a is not provided (hereinafter simply referred to as "thickness of the battery can 11"). The thin wall part 11a may be a groove as shown in FIG. 3A, or may be a planar portion in which a part of the circumferential surface 11S is cut into a side face as shown in FIG. 3B. A bottom surface of the thin wall part 11a may be a plane or curved surface, but from the viewpoint of ease of formation, it is preferred to be a plane surface. For example, as shown in FIG. 3C, the curved surface may be a curved surface of a part of a cylindrical surface concentric with the battery can 11.

In an embodiment, a cross-sectional shape of the groove is, for example, an almost polygonal shape, an almost partial circular shape, an almost partial elliptical shape, or an indefinite shape; however, the shape is not limited to these shapes. A curvature R or the like may be given to the top portion of the polygonal shape. Examples of the polygonal shape include a triangular shape, a quadrilateral shape such as a trapezoidal shape and a rectangular shape, and a pentagonal shape. Herein, the "partial circular shape" is a shape of a portion of a circular shape, for example, a semicircular shape. The partial elliptical shape is a shape of a portion of an elliptical shape, for example, a semielliptical shape. In the case where the groove has a bottom surface, the bottom surface may be, for example, a flat surface, an uneven surface having a difference in level, a curved surface having waviness, or a composite surface obtained by combining two or more of these surfaces.

When the groove is viewed from a direction perpendicular to the circumferential surface 11S, the groove has, for example, a linear shape, a curved shape, a folded line shape, a shape obtained by combining two or more of these shapes or the like, and the shape is preferably a linear shape from the viewpoint of ease of formation of the groove.

In an embodiment, a ratio ((W/D)×100) of a width W of the thin wall part 11a to an outer diameter D of the battery can 11 is, for example, 25% or less, preferably 16% or less, and more preferably 8% or less. When the ratio is 16% or less, the bottom surface of the thin wall part 11a can be made planar in the battery can 11 having a general wall thickness (see FIGS. 3A and 3B), and therefore the thin wall part 11a is easy formed. On the other hand, if the ratio exceeds 16%, it is necessary to form the bottom surface of the thin wall part 11a into a curved shape in the battery can 11 having a general wall thickness (see FIG. 3C), and therefore the thin wall part 11a may be difficult to be formed. In a battery can having Φ18 mm, the ratios of 16% and 8% correspond to widths of 3 mm and 1.5 mm, respectively.

The ratio of the width W of the thin wall part 11a to the outside diameter D of the battery can 11 is obtained as follows. First, the outer diameter D of the battery can 11 is determined with a measuring microscope (tool maker's microscope). Next, the width W of the thin wall part 11a is measured with the measuring microscope (tool maker's microscope) (see FIGS. 3A to 3C). In the case where the thin wall part 11a is a groove having a U-shaped cross section or a V-shaped cross section and the width W of the thin wall part 11a varies in the depth direction, the extension direction or the like, the widest portion of the width W of the thin wall part 11a is defined as the width W of the thin wall part. Next, using the obtained outer diameter D and width W, the ratio of the width W to the outer diameter D is obtained in terms of percentage ((W/D)×100).

In an embodiment, a ratio ((D1/D2)×100) of a thickness D1 of the thin wall part 11a to a thickness D2 of the battery can 11 is preferably 1% or more and 90% or less, and more preferably 10% or more and 80% or less. If the ratio is less than 1%, the thin wall part 11a may tear when a charge-discharge cycle is repeated many times. On the other hand, if the ratio exceeds 90%, when a battery in an overcharged state is accidentally dropped into fire, the contents of the battery may splash out or release from the battery.

The ratio of the thickness D1 of the thin wall part 11a to the thickness D2 of the battery can 11 is determined in the following manner. First, the battery can 11 as an outer can is embedded in resin and the resin is solidified. Next, after the resultant is sliced in rounds, the cut surface thereof is polished. Next, the cut surface is observed with a measuring microscope, and the thickness D1 of the thin wall part 11a and the thickness D2 of the battery can 11 are measured (see FIGS. 3A to 3C). Here, the thicknesses D1 and D2 are thicknesses in a direction perpendicular or substantially perpendicular to the circumferential surface 11S of the battery can 11. When the thickness D1 of the thin wall part 11a varies depending on the measurement position, a thickness of the thinnest portion of thicknesses D1 of the thin wall part 11a is defined as the thickness D1 of the thin wall part 11a (see FIG. 3B). When the thickness D2 of the battery can 11 varies depending on the measurement position, a thickness of the thickest portion of thicknesses D2 of the battery can 11 is defined as the thickness D2 of the battery can 11. Next, using the obtained thicknesses D1 and D2, the ratio of the thickness D1 of the thin wall part 11a to the thickness D2 of the battery can 11 is obtained in terms of percentage ((D1/D2)×100).

The thin wall part 11a may extend in a direction parallel to the center axis of the battery can 11 or may extend in a direction forming a predetermined angle with the central axis of the battery can 11; however, the thin wall part 11a preferably extends in the direction substantially parallel to the center axis of the battery can 11 from the viewpoint of ease of forming the wall portion 11a. When the thin wall part 11a forms a predetermined angle with the central axis of the battery can 11, the angle is preferably within 10°, more preferably within 5°, and still more preferably within 3°. If the angle exceeds 10°, it is necessary to form the thin wall part 11a over a range exceeding, for example, about 11 mm with respect to the circumferential direction, and therefore it may be difficult to form the thin wall part 11a. When the angle is 5° or less, it is sufficient to form the thin wall part 11a over a range of, for example, about 5 mm or less with respect to the circumferential direction, and therefore the thin wall part 11a can be formed easily. When the angle is 3° or less, it is sufficient to form the thin wall part 11a over a range of, for example, about 3 mm or less with respect to the circumferential direction, and therefore the thin wall part 11a can be formed more easily.

The configuration in which, as described herein, the thin wall part 11a is provided on the circumferential surface 11S exhibits a particularly remarkable effect when the configuration is applied to a battery in which a ratio ((r/R)×100) of an average hole diameter r of the center hole 20H to an average outer diameter R of the wound electrode body 20 is 17% or less. In the battery having such a configuration, although the capacity of the battery can be increased, the function of the center hole 20H as a guidepath for leading a gas produced at the time of abnormality to the safety valve mechanism 15 may become insufficient, and therefore it is necessary to provide a mechanism for improving safety in addition to the safety valve mechanism 15.

Figure 4A:
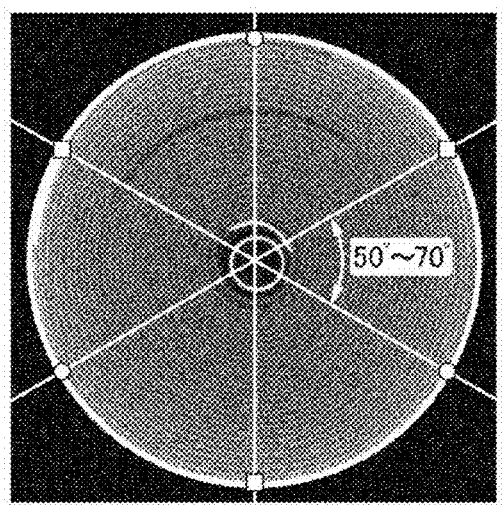
FIGS. 4A, 4B, and 4C are each a view for explaining a method of calculating an average outer diameter of a wound electrode body according to an embodiment.
Figure 4B:
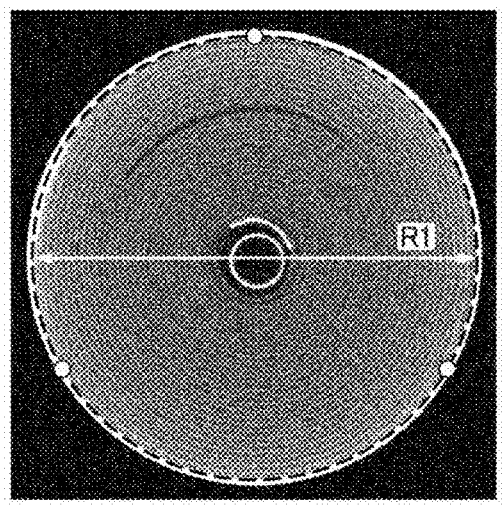
Figure 4C:
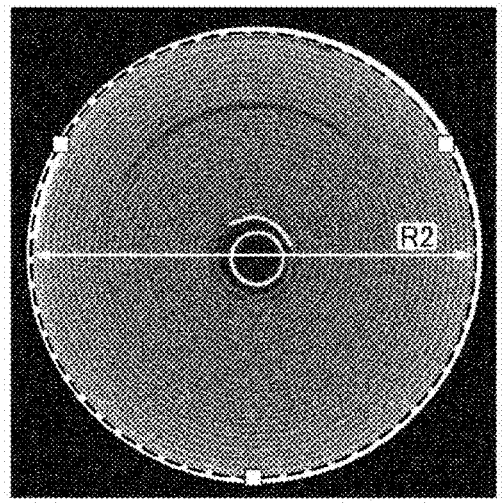
Figure 5A:
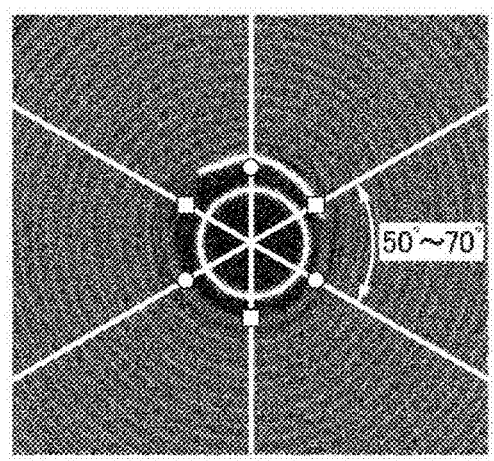
FIGS. 5A, 5B, and 5C are each a view for explaining a method of calculating an average hole diameter of the wound electrode body according to an embodiment.
Figure 5B:
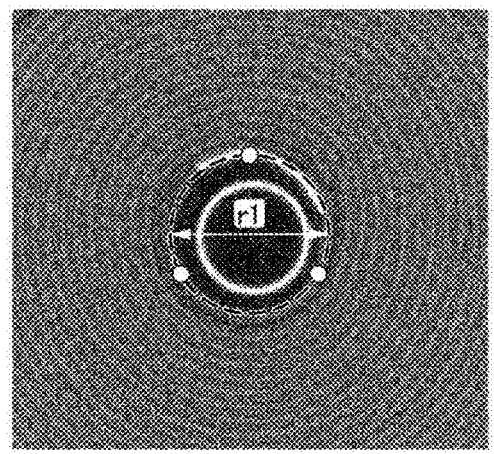
Figure 5C:
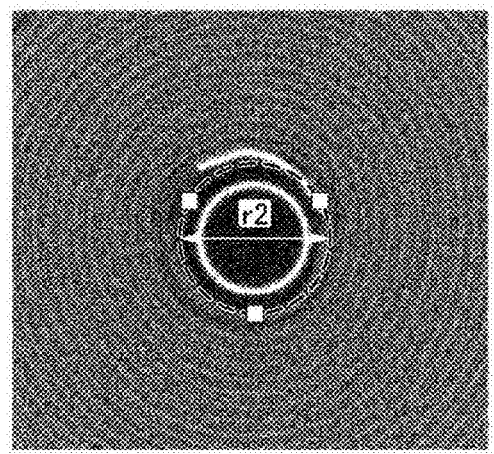

The ratio of the average hole diameter r of the center hole 20H to the average outer diameter R of the wound electrode body 20 is obtained as follows. First, using CT (Computed Tomography), cross-sectional images of a battery are photographed at each of positions of 20%, 50% and 80% from one end on the top side of the circumferential surface 11S of the battery. Next, as shown in FIG. 4A and FIG. 5A, six points are set on the current collector (for example, copper foil) of the outermost or innermost circumference of the wound electrode body 20 in the cross-sectional image photographed at the position of 20%. At this time, the angles between line segments connecting the center axis of the wound electrode body 20 and two points adjacent to each other on the current collector of the outermost or innermost circumference are all set to 50° to 70°. Next, as shown in FIGS. 4B and 5B, three points are alternately selected from six points on the circumference, diameters of a circle passing through the three points are denoted by R1 (outer diameter) and r1 (inner diameter), and diameters of a circle passing through the remaining three points are denoted by R2 (outer diameter) and r2 (inner diameter).

Next, using each of the cross-sectional images photographed at the positions of 50% and 80%, a diameters R3 or R4 (outer diameter) and r3 or r4 (inner diameter) of a circle are determined in the same manner as in the above. Next, the average outer diameter R is determined by simply averaging (arithmetic average) the determined diameters R1 to R6 (outer diameter). Further, the average hole diameter r is determined by simply averaging (arithmetic average) the determined diameters r1 to r6 (inner diameter). Next, using the obtained average outer diameter R and average hole diameter r, the ratio of the average hole diameter r to the average outer diameter R is obtained in terms of percentage ((r/R)×100).

A gas release pressure (rupture pressure) of the thin wall part 11a is preferably higher than a gas release pressure (operating pressure) of the safety valve mechanism 15. The thin wall part 11a is provided for the purpose of allowing a gas to escape to the outside of the battery when a large amount of gas is produced due to accidental dropping of the battery in an overcharged state into fire, and therefore it is necessary to prevent the rupture of the thin wall part 11a during ordinary use.

Figure 6:
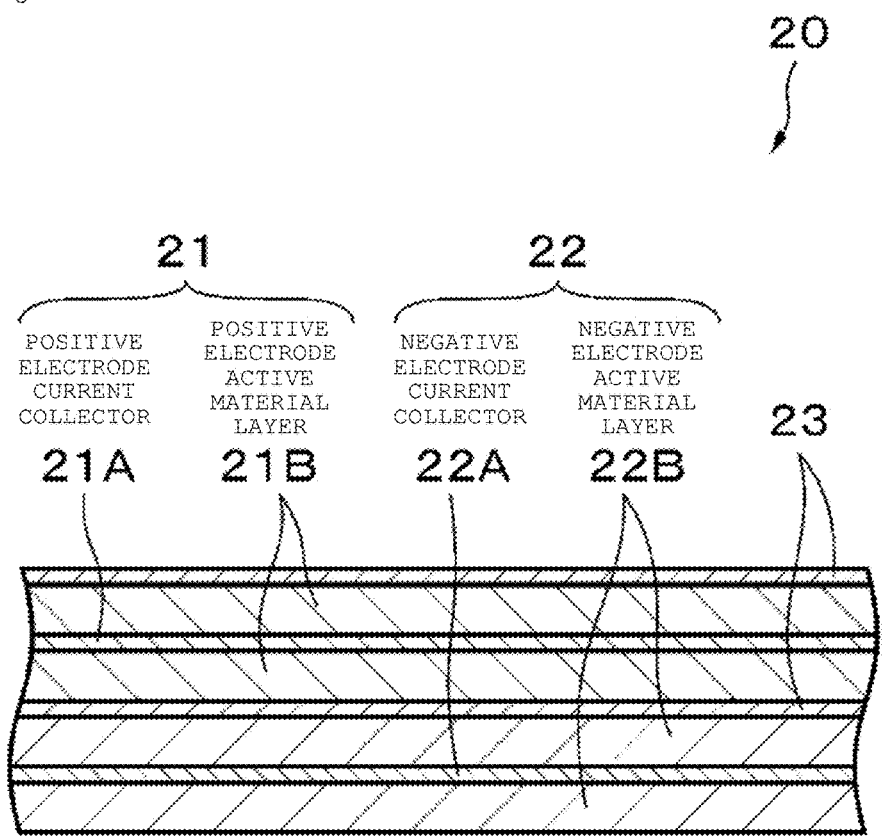
FIG. 6 is an enlarged cross-sectional view showing a portion of the wound electrode body shown in FIG. 1 according to an embodiment.

In an embodiment as shown in FIG. 6, the positive electrode 21 has a structure in which, for example, a positive electrode active material layer 21B is provided on both surfaces of a positive electrode current collector 21A. Although not shown, the positive electrode active material layer 21B may be provided only on one side of the positive electrode current collector 21A. The positive electrode current collector 21A is made of, for example, a metal foil such as an aluminum foil, a nickel foil, or a stainless steel foil. The positive electrode active material layer 21B contains, for example, a positive electrode active material capable of storing and releasing lithium (Li) serving as an electrode reactant. The positive electrode active material layer 21B may further contain an additive, as required. As the additive, for example, at least one of a conductive agent and a binder can be used.

In an embodiment, the positive electrode active material including, for example, lithium-containing compounds such as lithium oxide, lithium phosphorus oxide, lithium sulfide and an interlayer compound containing lithium are appropriate, and two or more of these compounds may be mixed and used. In order to increase the energy density, a lithium-containing compound containing lithium, a transition metal element, and oxygen (O) is preferred. Examples of the lithium-containing compound include lithium composite oxides having a layered rock-salt type structure represented by the formula (A) and lithium composite phosphates having an olivine type structure represented by the formula (B). It is more preferred that the lithium-containing compound contains at least one selected from the group consisting of cobalt (Co), nickel (Ni), manganese (Mn), iron (Fe) and combinations thereof as the transition metal element. Examples of the lithium-containing compound include lithium composite oxides having a layered rock-salt type structure represented by the formula (C), formula (D) or formula (E), lithium composite oxides having a spinel type structure represented by the formula (F), and lithium composite phosphates having an olivine type structure represented by the formula (G). Specific examples thereof include $LiNi_{0.50}Co_{0.20}Mn_{0.30}O_2$, $Li_aCoO_2$ ($a\approx1$), $Li_bNiO_2$ ($b\approx1$), $Li_{c1}Ni_{c2}Co_{1-c2}O_2$ ($c1\approx1$, $0<c2<1$), $Li_dMn_2O_4$ ($d\approx1$) and $Li_eFePO_4$ ($e\approx1$).

$$Li_pNi_{(1-q-r)}Mn_qM1_rO_{(2-y)}X_z \quad (A)$$

(In the formula (A), M1 represents at least one kind among elements selected from group 2 to group 15 except nickel (Ni) and manganese (Mn). X represents at least one kind among group-16 elements and group-17 elements except oxygen (O). p, q, y and z are values in ranges of $0\leq p\leq1.5$, $0\leq q\leq1.0$, $0\leq r\leq1.0$, $-0.10\leq y\leq0.20$, and $0\leq z\leq0.2$.)

$$Li_aM2_bPO_4 \quad (B)$$

(In the formula (B), M2 represents at least one kind among elements selected from group 2 to group 15. a and b are values in ranges of $0\leq a\leq2.0$ and $0.5\leq b\leq2.0$.)

$$Li_fMn_{(1-g-h)}Ni_gM3_hO_{(2-j)}F_k \quad (C)$$

(In the formula (C), M3 represents at least one kind selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), tungsten (W) and combinations thereof. f, g, h, j and k are values in ranges of $0.8\leq f\leq1.2$, $0<g<0.5$, $0 \le h \le 0.5$, $g+h<1$, $-0.1 \le j \le 0.2$, and $0 \le k \le 0.1$. The composition of lithium differs depending on the state of a charge/discharge and the value of f represents the value in the fully-discharged state.)

$$Li_mNi_{(1-n)}M4_nO_{(2-p)}F_q \quad (D)$$

(In the formula (D), M4 represents at least one kind selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W) and combinations thereof. m, n, p and q are values in ranges of $0.8 \le m \le 1.2$, $0.005 \le n \le 0.5$, $-0.1 \le p \le 0.2$, and $0 \le q \le 0.1$. The composition of lithium differs depending on the state of a charge/discharge and the value of m represents the value in the fully-discharged state.)

$$Li_rCo_{(1-s)}M5_sO_{(2-t)}F_u \quad (E)$$

(In the formula (E), M5 represents at least one kind selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W) and combinations thereof. r, s, t and u are values in ranges of $0.8 \le r \le 1.2$, $0 \le s < 0.5$, $-0.1 \le t \le 0.2$, and $0 \le u \le 0.1$. The composition of lithium differs depending on the state of a charge/discharge and the value of r represents the value in the fully-discharged state.)

$$Li_vMn_{2-w}M6_wO_xF_y \quad (F)$$

(In the formula (F), M6 represents at least one kind selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W) and combinations thereof. v, w, x and y are values in ranges of $0.9 \le v \le 1.1$, $0 \le w \le 0.6$, $3.7 \le x \le 4.1$, and $0 \le y \le 0.1$. The composition of lithium differs depending on the state of a charge/discharge and the value of v represents the value in the fully-discharged state.)

$$Li_zM7PO_4 \quad (G)$$

In the formula (G), M7 represents at least one kind selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), zirconium (Zr) and combinations thereof. z is a value in a range $0.9 \le z \le 1.1$. The composition of lithium differs depending on the state of a charge/discharge and the value of z represents the value in the fully-discharged state.)

As the lithium-containing compound containing Ni, a positive electrode material represented by the formula (H) is preferred.

$$Li_vNi_wM'_xM''_yO_z \quad (H)$$

(In the above formula, $0<v<2$, $w+x+y \le 1$, $0<w \le 1$, $0 \le x \le 0.5$, $0 \le y \le 0.5$, and $0<z<3$, and M' and M" are each at least one kind selected from Co (cobalt), Fe (iron), Mn (manganese), Cu (copper), Zn (zinc), Al (aluminum), Cr (chromium), V (vanadium), Ti (titanium), Mg (magnesium), Zr (zirconium) and combinations thereof.)

As the lithium-containing compound containing nickel (Ni), compounds having a Ni content of 80% or more are preferred. Because when the Ni content is 80% or more, a high battery capacity can be obtained. When such a lithium-containing compound having a high Ni content is used, the battery capacity increases as described above, but on the other hand, when abnormal heat is applied, an amount of gas produced (oxygen release amount) in the positive electrode 21 is significantly increased. In the battery according to an embodiment, a particularly excellent effect of improving safety is exhibited when such electrodes with high gas production amount are used.

Other examples of the positive electrode material capable of storing and releasing lithium include inorganic compounds containing no lithium such as $MnO_2$, $V_2O_5$, $V_6O_{13}$, NiS, and MoS.

The positive electrode material capable of storing and releasing lithium may be those other than described above. In addition, two or more kinds of positive electrode materials exemplified above may be mixed in arbitrary combination.

As the binder, at least one kind is used which is selected from resin materials such as polyvinylidene fluoride (PVdF), polytetrafluoroethylene (PTFE), polyacrylonitrile (PAN), styrene butadiene rubber (SBR) and carboxymethylcellulose (CMC), and copolymers predominantly composed of these resin materials.

Examples of the conductive agent include carbon materials such as graphite, carbon black, and Ketjen black, and one kind or two or more kinds thereof are mixed and used. Besides the carbon materials, a metal material, a conductive polymer material, or the like may be used as long as it has conductivity.

In an embodiment as shown in FIG. 6, the negative electrode 22 has a structure in which, for example, a negative electrode active material layer 22B is provided on both surfaces of a negative electrode current collector 22A. Although not shown, the negative electrode active material layer 22B may be provided only on one side of the negative electrode current collector 22A. The negative electrode current collector 22A is made of, for example, a metal foil such as an aluminum foil, a nickel foil, or a stainless steel foil.

The negative electrode active material layer 22B contains one or more negative electrode active materials capable of storing and releasing lithium as a negative electrode active material. The negative electrode active material layer 22B may further contain an additive such as a binder.

In the battery according to an embodiment, an electrochemical equivalent of the negative electrode material capable of storing and releasing lithium is larger than an electrochemical equivalent of the positive electrode 21, and lithium metal is not deposited on the negative electrode 22 while the battery is charged.

Examples of the negative electrode material capable of storing and releasing lithium include materials that is capable of storing and releasing lithium and that contains at least one kind of a metal element and a metalloid element as a constituent element. Herein, the negative electrode 22 including such a negative electrode material is referred to as an alloy negative electrode. Because a high energy density can be achieved by using such a material. Particularly, when the negative electrode material is used together with a carbon material, it is more preferred because high energy density can be achieved and excellent cycle characteristics can be attained. The negative electrode material may be a simple substance, an alloy or a compound of a metal element or metalloid element, or may be one having at least partially phases of one or more of these. In the present technology according to an embodiment, the alloy includes not only alloys composed of two or more kinds of metal elements but also alloys containing one or more kinds of metal elements and one or more kinds of metalloid elements. Also, the alloy may contain a nonmetallic element. In some alloys, a solid solution, a eutectic alloy (eutectic mixture), an intermetallic compound, or two or more kinds of them coexist in the composition thereof.

Examples of the metal element or metalloid element constituting the negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). These elements may be crystalline or amorphous.

Among them, as the negative electrode material, a substance containing a metal element or a metalloid element of group 4B in the short-form periodic table as a constituent element is preferred, and the negative electrode material containing at least one of silicon (Si) and tin (Sn) as a constituent element is particularly preferred. This is because silicon (Si) and tin (Sn) have high capability of storing and releasing lithium (Li) and can achieve high energy density.

Examples of an alloy of tin (Sn) include alloys containing, as a second constituent element other than tin (Sn), at least one kind selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), chromium (Cr), and combinations thereof. Examples of an alloy of silicon (Si) include alloys containing, as a second constituent element other than silicon (Si), at least one kind selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), chromium (Cr), and combinations thereof.

Examples of a compound of tin (Sn) or a compound of silicon (Si) include those containing oxygen (O) or carbon (C), and the compound may contain the above-mentioned second constituent element in addition to tin (Sn) or silicon (Si).

Specific examples of the compound of tin (Sn) include silicon oxide represented by $SiO_v$ ($0.2<v<1.4$).

Examples of the negative electrode material capable of storing and releasing lithium include carbon materials such as non-graphitizing carbon, graphitizing carbon, graphite, pyrolytic carbons, cokes, glassy carbons, organic polymer compound baked body, carbon fiber, or activated carbon. As the graphite, it is preferred to use natural graphite subjected to a spheroidizing treatment or the like, and substantially spherical artificial graphite. As the artificial graphite, artificial graphite obtained by graphitizing mesocarbon microbeads (MCMB) or artificial graphite obtained by graphitizing and pulverizing cokes raw material is preferred. The cokes include pitch coke, needle coke and petroleum coke. The organic polymer compound baked body refers to a substance obtained by baking a polymer material such as a phenol resin or a furan resin at an adequate temperature to carbonize it, and part thereof is classified into non-graphitizing carbon or graphitizing carbon. Further, as the polymer material, polyacetylene, polypyrrole or the like is available. These carbon materials are preferred since changes in crystal structure generated at the time of charging and discharging are very small, a high charge and discharge capacity can be obtained, and good cycle characteristics can be attained. In particular, graphite is preferred since it has a large electrochemical equivalent and can achieve high energy density. In addition, non-graphitizing carbon is preferred since excellent characteristics are obtained. Furthermore, those having a low charge-discharge potential, specifically those having a charge-discharge potential close to that of lithium metal, are preferred since they can easily realize high energy density of the battery.

Examples of the negative electrode material capable of storing and releasing lithium further include other metal compounds and polymer materials. Examples of the other metal compounds include oxides such as $MnO_2$, $V_2O_5$, and $V_6O_{13}$, sulfides such as NiS and MoS, lithium nitrides such as $LiN_3$, and examples of the polymer materials include polyacetylene, polyaniline, and polypyrrole.

As the binder, at least one kind is used which is selected from resin materials such as polyvinylidene fluoride (PVdF), polytetrafluoroethylene (PTFE), polyacrylonitrile (PAN), styrene butadiene rubber (SBR) and carboxymethylcellulose (CMC), and copolymers predominantly composed of these resin materials.

The separator 23 separates the positive electrode 21 and the negative electrode 22, and allows lithium ions to pass while preventing a short circuit of the current caused by contact between both electrodes. The separator 23 is composed of, for example, a porous film made of a synthetic resin including polytetrafluoroethylene, polypropylene, polyethylene or the like, or a porous film made of ceramic, and the separator 23 may have a structure formed by laminating two or more of these porous films. Among these films, a polyolefin porous film is preferred since it is excellent in the effect of preventing a short circuit and can improve battery safety by a shutdown effect. In particular, polyethylene is preferred as a material constituting the separator 23 since polyethylene can achieve a shutdown effect in a range of 100° C. or higher and 160° C. or lower, and is also excellent in electrochemical stability. In addition, polypropylene is also preferred, and a resin can be used by copolymerizing with or blending with polyethylene or polypropylene as long as the resin has chemical stability.

The separator 23 is impregnated with an electrolytic solution which is a liquid electrolyte. The electrolytic solution contains a solvent and an electrolyte salt dissolved in the solvent. In order to improve battery characteristics, the electrolytic solution may contain publicly known additives.

As the solvent, a cyclic carbonate ester such as ethylene carbonate or propylene carbonate can be used, and it is preferred to use one of ethylene carbonate and propylene carbonate, particularly, a mixture thereof. This is because cycle characteristics can be improved.

As the solvent, it is preferred to use a mixture of chain carbonate esters such as diethyl carbonate, dimethyl carbonate, ethyl methyl carbonate or methyl propyl carbonate, in addition to these cyclic carbonate esters. This is because high ionic conductivity can be achieved.

The solvent preferably further contains 2,4-difluoroanisole or vinylene carbonate. The reason for this is that 2,4-difluoroanisole can improve discharge capacity and vinylene carbonate can improve cycle characteristics. Therefore, when these materials are mixed and used, it is preferred because discharge capacity and cycle characteristics can be improved.

Examples of the solvent other than these solvents include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

In an embodiment, a compound in which at least a part of hydrogen of these nonaqueous solvents is substituted with fluorine may be preferred because it may improve the reversibility of electrode reaction depending on the kinds of electrodes to be combined.

The electrolyte salt includes, for example, lithium salts, and lithium salts may be used alone, or may be used as a mixture of two or more thereof. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bis(oxalate)borate, and LiBr. Among them, $LiPF_6$ is preferred since it can achieve high ionic conductivity and can improve cycle characteristics.

When the battery having the above configuration is subjected to charging, for example, lithium ions are released from the positive electrode active material layer 21B and stored in the negative electrode active material layer 22B via the electrolytic solution. Further, when the battery is subjected to discharging, for example, lithium ions are released from the negative electrode active material layer 22B and stored in the positive electrode active material layer 21B via the electrolytic solution.

Next, an example of a method for manufacturing the battery according to an embodiment of the present technology will be described.

First, for example, a positive electrode mixture is prepared by mixing a positive electrode active material, a conductive agent, and a binder, and the positive electrode mixture is dispersed in a solvent such as N-methyl-2-pyrrolidone (NMP) to prepare a paste-like positive electrode mixture slurry. Next, the positive electrode mixture slurry is applied onto the positive electrode current collector 21A, and the solvent is dried. Then, compression molding is performed by a roll-press machine or the like to thereby form the positive electrode active material layer 21B, so that the positive electrode 21 is formed.

In addition, for example, a negative electrode active material and a binder are mixed to prepare a negative electrode mixture, and the negative electrode mixture is dispersed in a solvent such as N-methyl-2-pyrrolidone to prepare a paste-like negative electrode mixture slurry. Next, the negative electrode mixture slurry is applied onto the negative electrode current collector 22A, and the solvent is dried. Then, compression molding is performed by a roll-press machine or the like to thereby form the negative electrode active material layer 22B, so that the negative electrode 22 is prepared.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound with the separator 23 interposed between the positive electrode 21 and the negative electrode 22. Then, a tip portion of the positive electrode lead 25 is welded to the safety valve mechanism 15, a tip portion of the negative electrode lead 26 is welded to the battery can 11, and the wound positive electrode 21 and negative electrode 22 are sandwiched between a pair of insulating plates 12 and 13, and housed inside the battery can 11. Next, after the positive electrode 21 and the negative electrode 22 are housed inside the battery can 11, an electrolytic solution is injected into the battery can 11, and the separator 23 is impregnated with the electrolytic solution. The battery cover 14, the safety valve mechanism 15 and the positive temperature coefficient element 16 are fixed to the open end of the battery can 11 by being caulked with the sealing gasket 17. Accordingly, the secondary battery shown in FIG. 1 is obtained.

In the battery according to an embodiment described herein, at least one thin wall part 11a is provided on the circumferential surface 11S of the battery can 11, and the ratio of the average hole diameter of the center hole 20H to the average outer diameter of the wound electrode body 20 is 17% or less, and the thin wall part 11a is provided in one or both of the regions in the range of 0% or more and 30% or less and the range of 70% or more and 100% or less from one end on the top side of the circumferential surface 11S. Accordingly, even when a large amount of gas is produced due to accidental dropping of a battery in an overcharged state into fire, the thin wall part 11a can be ruptured to release the gas. Further, even when charge-discharge cycle is repeated many times, tear of the thin wall part 11a can be suppressed. Accordingly, the safety of the battery can be improved.

In the embodiment described herein, the battery having the center pin 24 has been described, but a battery without the center pin 24 may be used. Even with a battery having such a configuration, an effect of improving safety can be achieved as with the battery according to the embodiment described above.

In another embodiment, a battery pack including the battery according to an embodiment and an electronic device will be described.

Figure 7:
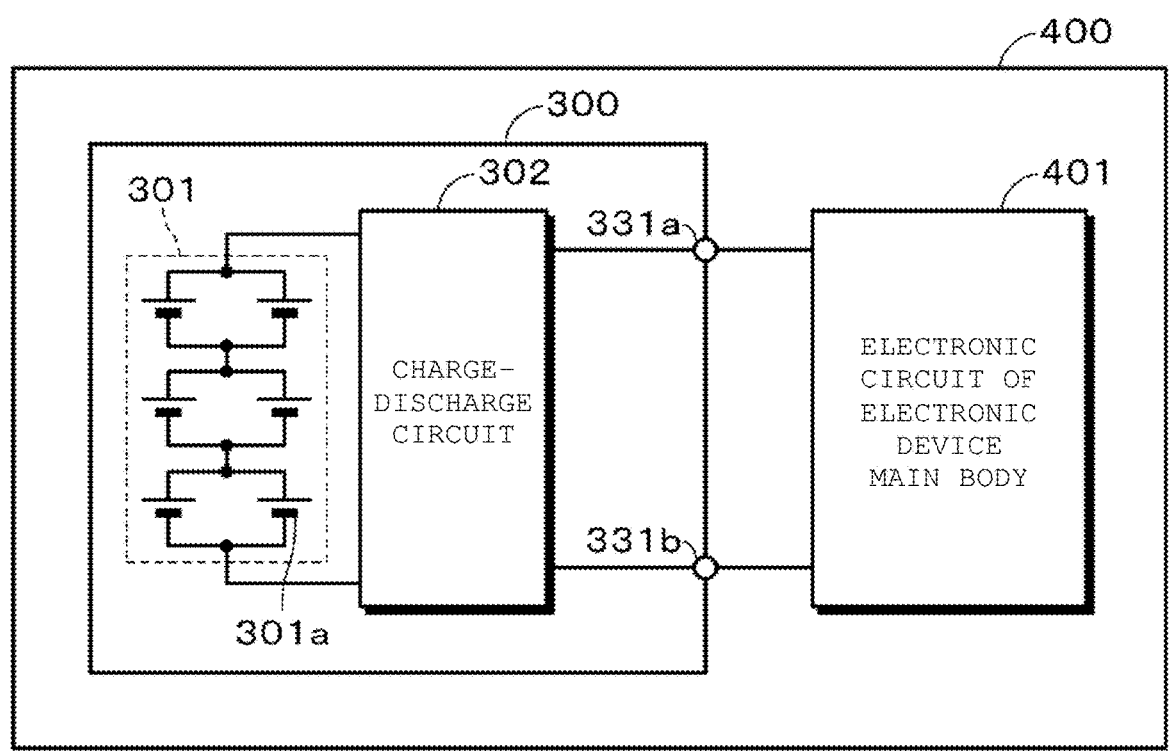
FIG. 7 is a block diagram showing one configuration example of an electronic device according to an embodiment of the present technology.

Hereinafter, with reference to FIG. 7, one configuration example of each of a battery pack 300 and an electronic device 400 according to an embodiment of the present technology will be described. The electronic device 400 includes an electronic circuit 401 of an electronic device main body and a battery pack 300. The battery pack 300 is electrically connected to the electronic circuit 401 via a positive electrode terminal 331a and a negative electrode terminal 331b. For example, the electronic device 400 has a configuration which allows the user to detachably attach the battery pack 300. The configuration of the electronic device 400 is not limited to the above configuration, and the electronic device 400 may have a configuration in which the battery pack 300 is incorporated in the electronic device 400 so that the user cannot remove the battery pack 300 from the electronic device 400.

When the battery pack 300 is charged, the positive electrode terminal 331a and the negative electrode terminal 331b of the battery pack 300 are connected to a positive electrode terminal and a negative electrode terminal of a charger (not shown), respectively. On the other hand, when the battery pack 300 is discharged (when the electronic device 400 is used), the positive electrode terminal 331a and the negative electrode terminal 331b of the battery pack 300 are connected to a positive electrode terminal and a negative electrode terminal of the electronic circuit 401, respectively.

Examples of the electronic device 400 include, but are not limited to, a notebook-sized personal computer, a tablet computer, a mobile phone (for example, smart phone), personal digital assistants (PDA), display devices (LCD, EL display, electronic paper, etc.), imaging devices (for example, digital still camera, digital video camera), an audio instrument (for example, potable audio player), a game machine, a cordless phone handset, an electronic book, an electronic dictionary, a radio, a headphone, a navigation system, a memory card, a pace maker, a hearing aid, an electric power tool, an electric shaver, a refrigerator, an air conditioner, a television set, a stereo, a water heater, a microwave oven, a dishwashing machine, a washing machine, a drier, lighting equipment, a toy, a medical device, a robot, a load conditioner, and a traffic light.

The electronic circuit 401 includes, for example, a CPU, a peripheral logic part, an interface part, a storage part, and the like, and controls the entire of the electronic device 400.

The battery pack 300 includes an assembled battery 301 and a charge-discharge circuit 302. The assembled battery 301 is configured by connecting a plurality of secondary batteries 301a in series and/or in parallel. The plurality of secondary batteries 301a are connected, for example, such that n batteries are connected in parallel and m batteries are connected in series (n and m are positive integers). FIG. 7 shows an example in which six secondary batteries 301a are connected with two batteries in parallel and three batteries in series (2P3S). As the secondary battery 301a, the battery according to an embodiment is used.

The charge-discharge circuit 302 is a control circuit for controlling charge and discharge of the assembled battery 301. Specifically, at the time of charging, the charge-discharge circuit 302 controls charge to the assembled battery 301. On the other hand, at the time of discharging (that is, when the electronic device 400 is used), the charge-discharge circuit 302 controls discharge to the electronic device 400.

In an embodiment described herein, the case where the battery pack 300 includes the assembled battery 301 configured by the plurality of secondary batteries 301a has been described as an example; however, a configuration may be adopted in which the battery pack 300 includes a single secondary battery 301a in place of the assembled battery 301.

In another embodiment, an electric storage system including the battery according to an embodiment in the electric storage device will be described. The electric storage system may be any system as long as it uses entirely electric power and includes merely an electric power device. The electric power system according to an embodiment includes, for example, a smart grid, a household energy management system (HEMS), a vehicle and the like, and can also store electricity.

Figure 8:
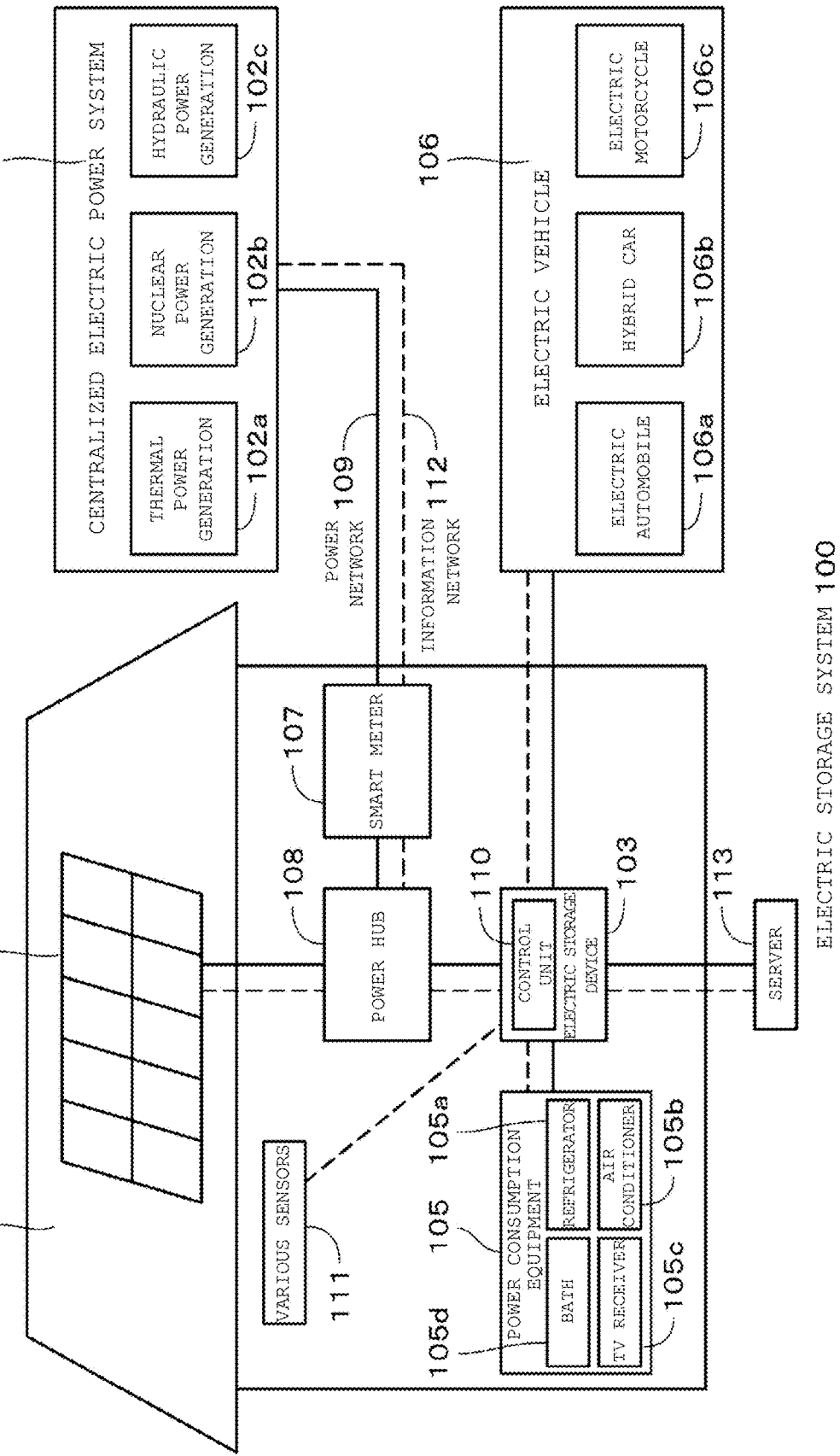
FIG. 8 is a schematic diagram showing one configuration example of an electric storage system according to an embodiment of the present technology.

Hereinafter, with reference to FIG. 8, a configuration example of an electric storage system (electric power system) 100 according to an embodiment will be described. The electric storage system 100 is an electric storage system for residential use, and electric power is supplied from a centralized electric power system 102 such as a thermal power generation 102a, a nuclear power generation 102b and a hydraulic power generation 102c to the electric storage device 103 via a power network 109, an information network 112, a smart meter 107, a power hub 108 and the like. With this, electric power is supplied from an independent power supply such as domestic electric power generation equipment 104 to the electric storage device 103. The electric power supplied to the electric storage device 103 is stored. Electric power to be used in a house 101 is supplied by way of the electric storage device 103. A similar electric storage system can be used not only for the house 101 but also for a building.

In the house 101, the domestic power generation equipment 104, power consumption equipment 105, the electric storage device 103, a control circuit 110 including a processor for controlling each equipment, the smart meter 107, the power hub 108, and sensors 111 for acquiring various kinds of information are provided. The respective pieces of equipment are connected by the power network 109 and the information network 112. A solar cell, a fuel cell, or the like is used as the domestic power generation equipment 104, and the generated electric power is supplied to the power consumption equipment 105 and/or the electric storage device 103. The power consumption equipment 105 is a refrigerator 105a, an air conditioner 105b, a television receiver 105c, a bath 105d, or the like. Furthermore, the power consumption equipment 105 includes an electric vehicle 106. The electric vehicle 106 includes an electric automobile 106a, a hybrid car 106b, an electric motorcycle or bicycle 106c, or the like.

The electric storage device 103 includes the battery according to an embodiment. The smart meter 107 has a function of measuring the use amount of commercial power and sending the use amount measured to an electric power company. The power network 109 may be any one or combination of DC (direct current) power supply, AC (alternate current) power supply, and non-contact power supply.

The various sensors 111 are, for example, a monitor sensor, an illuminance sensor, an object detection sensor, a power consumption sensor, a vibration sensor, a contact sensor, a temperature sensor, an infrared sensor, and the like. Information acquired by the various sensors 111 is transmitted to the control circuit 110. Based on the information from the sensors 111, the state of weather, the state of person, etc., are grasped and the power consumption equipment 105 is automatically controlled to allow minimization of the energy consumption. Further, the control circuit 110 can transmit information relating to the house 101 to an external electric power company or the like via an Internet. The control circuit 110 may include a processor configured to perform the processing of the information.

Branching of the power line and processing of DC-AC conversion and the like are carried out by the power hub 108. As a communication system of the information network 112 connected to the control circuit 110, there are a method of using a communication interface such as UART (Universal Asynchronous Receiver-Transceiver: transmitting/receiving circuit for asynchronous serial communication) and a method of utilizing a sensor network based on a wireless communication standard such as Bluetooth, ZigBee, or Wi-Fi. Bluetooth (registered trademark) system is applied to multimedia communication and allows communication of a one-to-many connection. ZigBee is a standard using a physical layer of IEEE (Institute of Electrical and Electronics Engineers) 802.15.4. IEEE 802.15.4 is the name of a short-range wireless network standard called PAN (Personal Area Network) or W (Wireless) PAN.

The control circuit 110 is connected to an external server 113. The server 113 may be managed by any of the house 101, an electric power company, and a service provider. The information transmitted and received by the server 113 is, for example, power consumption information, life pattern information, electric power bill, weather information, natural disaster information, and information relating to power trading. These pieces of information may be transmitted and received from a power consumption equipment (for example, a television receiver) in the home, or may be transmitted and received from equipment outside the home (for example, mobile phone). These pieces of information may be displayed on apparatus having a display function, such as a television receiver, a mobile phone, and a PDA (personal digital assistants).

The control circuit 110 that controls the respective sections is configured by CPU (central processing unit), RAM (random access memory), ROM (read only memory) and the like, and is stored in the electric storage device 103 in this example. The control circuit 110 is connected to the electric storage device 103, the domestic power generation equipment 104, the power consumption equipment 105, the various sensors 111, and the server 113 via the information network 112, and has, for example, a function of adjusting the use amount of commercial power and the amount of power generation. In addition, the control circuit 110 may have a function to carry out power trading in a power market and the like.

As described above, not only power by the centralized power system 102 of the thermal power generation 102*a*, the nuclear power generation 102*b*, the hydraulic power generation 102*c*, etc. but also generated electric power of the domestic power generation equipment 104 (solar power generation, wind power generation) in the home can be stored in the electric storage device 103. Therefore, even though the generated electric power of the domestic power generation equipment 104 varies, it is possible to perform such control that the amount of electric power sent to the outside is made constant or discharged as necessary. For example, electric power obtained by solar power generation is stored in the electric storage device 103 and low-cost late-night power is stored in the electric storage device 103 in the night. Furthermore, the electric power stored by the electric storage device 103 is discharged and utilized in a high-cost time zone in the daytime.

Although the example in which the control circuit 110 is stored in the electric storage device 103 has been described in this example, the control circuit 110 may be stored in the smart meter 107 or may be configured singly. Further, the electric storage system 100 may be used for a plurality of homes in a collective housing, or may be used for a plurality of single-family houses.

In another embodiment, an electric vehicle including the battery according to an embodiment will be described.

Figure 9:
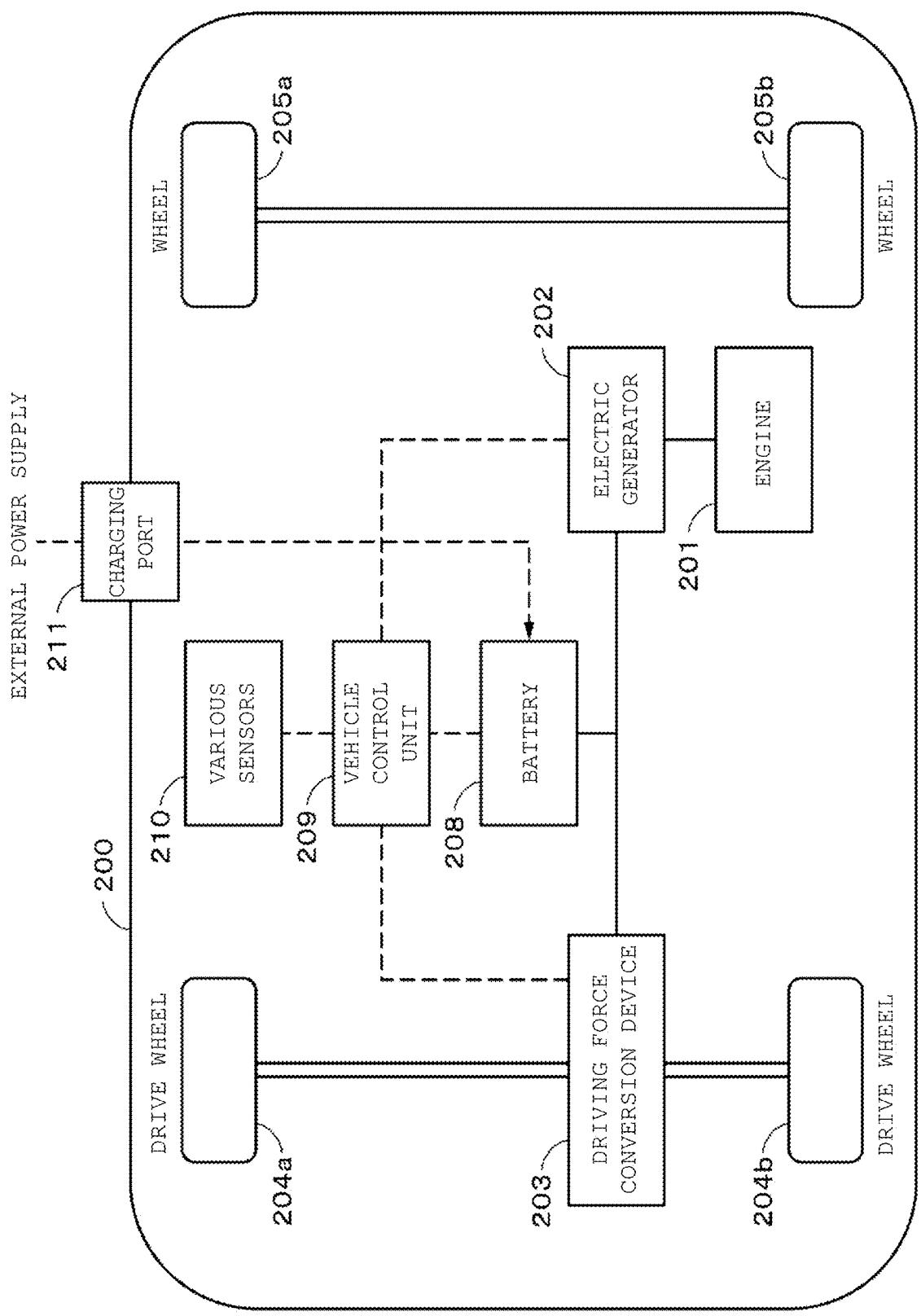
FIG. 9 is a schematic diagram showing one configuration of an electric vehicle according to an embodiment of the present technology.

With reference to FIG. 9, one configuration of an electric vehicle according to an embodiment of the present technology will be described. This hybrid vehicle 200 includes a hybrid vehicle employing a series hybrid system. The series hybrid system is a car that runs with an electric power driving force converting device 203 by using electric power generated by an electric generator activated through an engine or electric power once stored in a battery.

In the hybrid vehicle 200, an engine 201, an electric generator 202, an electric power driving force converting device 203, a driving wheel 204*a*, a driving wheel 204*b*, a wheel 205*a*, a wheel 205*b*, a battery 208, a vehicle control unit 209, various sensors 210, and a charging port 211 are mounted. As the battery 208, the battery according to an embodiment described herein is used.

The hybrid vehicle 200 runs by using the electric power driving force converting device 203 as a power source. In an embodiment, the electric power driving force converting device 203 includes a motor. The electric power driving force converting device 203 is operated by the electric power of the battery 208 and the rotational force of the electric power driving force converting device 203 is transmitted to the driving wheels 204*a* and 204*b*. By using direct current-alternating current (DC-AC) or reverse conversion (AC-DC conversion) for the necessary place, the electric power driving force converting device 203 can be applied to both an AC motor and a DC motor. The various sensors 210 control the engine rotational speed via the vehicle control unit 209 and control the opening degree of a throttle valve that is not shown in the diagram (throttle opening). The various sensors 210 include a velocity sensor, an acceleration sensor, an engine rotational speed sensor, or the like.

The rotational force of the engine 201 is transmitted to the electric generator 202, and the electric power generated by the electric generator 202 through the rotational force can be accumulated in the battery 208.

When the hybrid vehicle 200 decelerates by a braking mechanism that is not shown in the diagram, resistance force at the time of deceleration is applied to the electric power driving force converting device 203 as a rotational force, and regenerative electric power generated by the electric power driving force converting device 203 is accumulated in the battery 208 by the rotational force.

It is also possible that the battery 208 is connected to a power supply outside the hybrid vehicle 200 through the charging port 211 to thereby receive supply of electric power from the external power supply by using the charging port 211 as an input port and accumulate the received power.

Although not shown in the diagram, the hybrid vehicle 200 may include an information processing device that executes information processing relating to vehicle control based on information relating to the battery. As such an information processing device, for example, there is an information processing device for displaying the battery remaining capacity based on information relating to the remaining capacity of the battery, or the like.

The above is an example of a series hybrid car that runs with a motor by using electric power generated by an electric generator activated through an engine or electric power once stored in a battery. However, the present technology can be effectively applied also to a parallel hybrid car that employs both outputs of engine and motor as the drive source and uses, with arbitrary switching, three systems, running by only the engine, running by only the motor, and running by the engine and the motor. Furthermore, the present technology can be effectively applied also to a so-called electric vehicle that does not use an engine and runs by driving by only a drive motor.

Hereinafter, the present technology will be described with reference to examples, but it should be appreciated and understood that the present technology is not limited to only these examples.

In the following examples and comparative examples, the ratio $((r/R)\times 100)$ of the average hole diameter r of the center hole to the average outer diameter R of the wound electrode body, and the ratio $((L/H)\times 100)$ of the length L of the thin wall part to the height (width) H of the circumferential surface were determined in the same manner as in the above embodiment. In the following examples and comparative examples, the thin wall part was a groove.

EXAMPLE 1-1

A positive electrode was prepared as follows according to an embodiment. First, a positive electrode mixture was prepared by mixing NCM (nickel-cobalt-manganese) as an active material, fine carbon powder as a conductive agent and PVDF (polyvinylidene fluoride) as a binder, and the mixture was dispersed in N-methyl-2-pyrrolidone as a solvent, thereby preparing a paste-like positive electrode mixture slurry. Next, the positive electrode mixture slurry was applied onto both sides of a positive electrode current collector made of a belt-like aluminum foil (12 μm in thickness), and dried. Then, compression molding was performed by a roll-press machine to form a positive electrode active material layer. Next, a positive electrode lead made of aluminum was attached to one end of the positive electrode current collector by welding.

A negative electrode was prepared as follows according to an embodiment. First, a negative electrode mixture was prepared by mixing artificial graphite powder as a negative electrode active material and polyvinylidene fluoride as a binder, and the mixture was dispersed in N-methyl-2-pyrrolidone, thereby preparing a paste-like negative electrode mixture slurry. Next, the negative electrode mixture slurry was applied onto both sides of a negative electrode current collector made of a belt-like copper foil (15 µm in thick), and dried. Then compression molding was performed by a roll-press machine to form a negative electrode active material layer. Next, a negative electrode lead made of nickel was attached to one end of the negative electrode current collector.

A battery was assembled as follows. First, the positive electrode and the negative electrode thus obtained were laminated with a separator made of a microporous polyethylene stretched film having a thickness of 23 µm interposed therebetween in the order of the negative electrode, the separator, the positive electrode, and the separator, and the resulting laminate was wound many times to form a wound electrode body of a jelly roll type as a power generation element. The ratio between the average outer diameter and the average hole diameter (average inner diameter) of the wound electrode body was set so that average outer diameter:average hole diameter=100:12.5 ($\phi$:2.2 mm). That is, the ratio ((r/R)×100) of the average hole diameter r of the wound electrode body to the average outer diameter R of the wound electrode body was set to 12.5%.

Next, as shown in FIG. 10A, there was prepared a battery can provided with one groove that extended over a range of 70% or more and 100% or less from one end on the top side of the outer circumferential surface. Then, a center pin was inserted into the center hole of the wound electrode body, the wound electrode body was sandwiched between a pair of insulating plates, the negative electrode lead was welded to the battery can, the positive electrode lead was welded to a safety valve mechanism, and the wound electrode body was housed inside the battery can. Next, a nonaqueous electrolytic solution was prepared by dissolving $LiPF_6$ as an electrolyte salt so as to have a concentration of 1 $mol/dm^3$ in a solvent in which ethylene carbonate and methylethyl carbonate were mixed in a volume ratio of 1:1.

Finally, the electrolytic solution was injected into the battery can including the wound electrode body, and then a safety valve, a PTC element and a battery cover were fixed by caulking the battery can with an insulation sealing gasket, so that a cylindrical battery having an outer diameter (diameter) of 18 mm and a height of 65 mm was prepared.

EXAMPLE 1-2

A battery was obtained in the same manner as in Example 1-1 except that the center pin was not inserted into the center hole of the wound electrode body in the battery assembling step.

EXAMPLES 2-1, 2-2

As shown in FIG. 10B, a battery in each of Examples 2-1 and 2-2 was obtained in the same manner as in Examples 1-1 and 1-2, respectively, except for using a battery can provided with one groove that extended over a range of 0% or more and 30% or less from one end on the top side of the outer circumferential surface.

EXAMPLES 3-1, 3-2

Figure 10C:
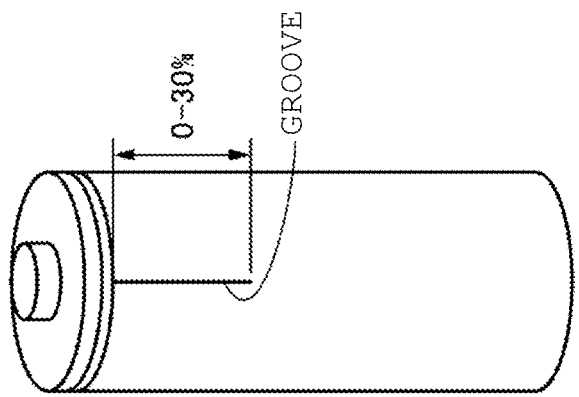

As shown in FIG. 10C, a battery in each of Examples 3-1 and 3-2 was obtained in the same manner as in Examples 1-1 and 1-2, respectively, except for using a battery can provided with four grooves that extended over a range of 70% or more and 100% or less from one end on the top side of the outer circumferential surface, and that were disposed at equal intervals in a circumferential direction of the outer circumferential surface.

EXAMPLES 4-1, 4-2

Figure 10D:
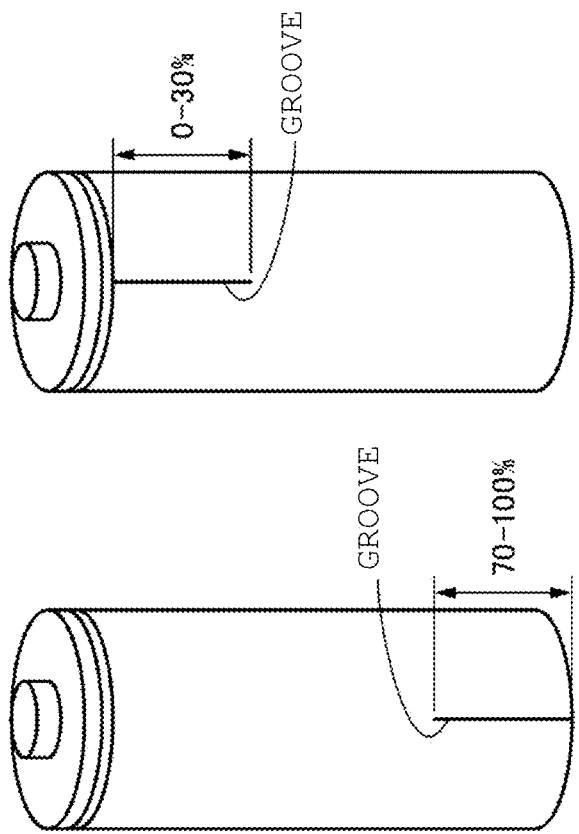

As shown in FIG. 10D, a battery in each of Examples 4-1 and 4-2 was obtained in the same manner as in Examples 1-1 and 1-2, respectively, except for using a battery can provided with four grooves that extended over a range of 0% or more and 30% or less from one end on the top side of the outer circumferential surface, and that were disposed at equal intervals in a circumferential direction of the outer circumferential surface.

EXAMPLES 5-1, 5-2

As shown in FIG. 11A, a battery in each of Examples 5-1 and 5-2 was obtained in the same manner as in Examples 1-1 and 1-2, respectively, except for using a battery can provided with one groove and one groove that extended over a range of 0% or more and 30% or less and a range of 70% or more and 100% or less, respectively, from one end on the top side of the outer circumferential surface, and that were positioned in the same straight line extending in a height direction of the battery can.

EXAMPLES 6-1, 6-2

As shown in FIG. 11B, a battery in each of Examples 6-1 and 6-2 was obtained in the same manner as in Examples 1-1 and 1-2, respectively, except for using a battery can provided with one groove and one groove that extended over a range of 0% or more and 30% or less and a range of 70% or more and 100% or less, respectively, from one end on the top side of the outer circumferential surface, and that were not positioned in the same straight line extending in a height direction of the battery can but were displaced with respect to each other in a circumferential direction of the outer circumferential surface.

EXAMPLES 7-1, 7-2

Figure 11C:
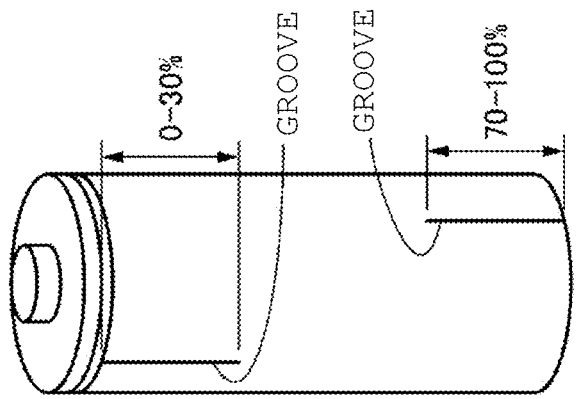

As shown in FIG. 11C, a battery in each of Examples 7-1 and 7-2 was obtained in the same manner as in Examples 1-1 and 1-2, respectively, except for using a battery can provided with one groove that extended over a range of 75% or more and 95% or less from one end on the top side of the outer circumferential surface.

EXAMPLES 8-1, 8-2

Figure 11D:
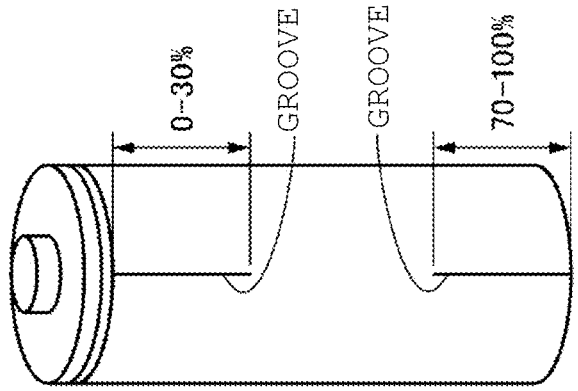

As shown in FIG. 11D, a battery in each of Examples 8-1 and 8-2 was obtained in the same manner as in Examples 1-1 and 1-2, respectively, except for using a battery can provided with one groove that extended over a range of 5% or more and 25% or less from one end on the top side of the outer circumferential surface.

EXAMPLES 9-1, 9-2

Figure 12D:
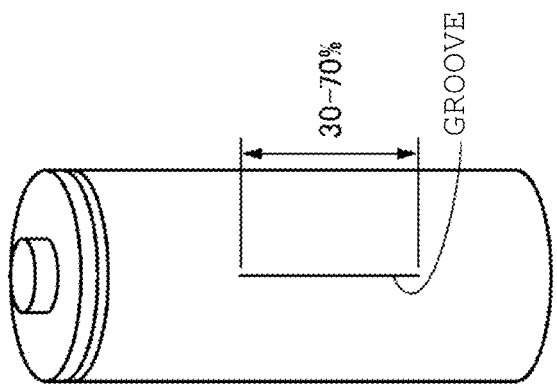
FIGS. 12A, 12B, 12C and 12D are each a schematic view for explaining formation positions of grooves with respect to the circumferential surface according to an embodiment.
Figure 12C:
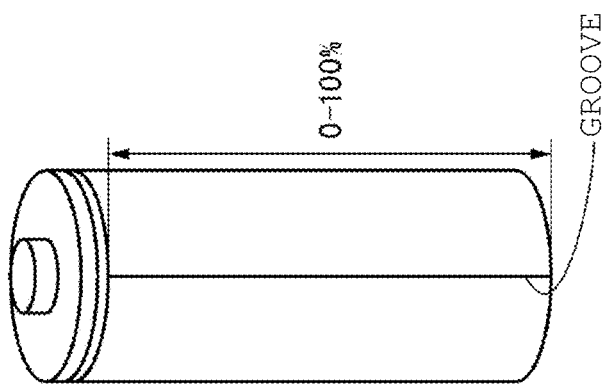
Figure 12B:
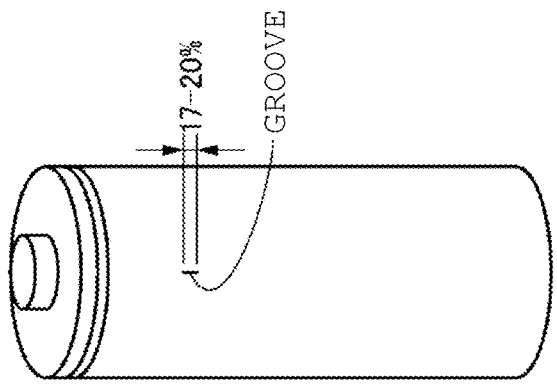
Figure 12A:
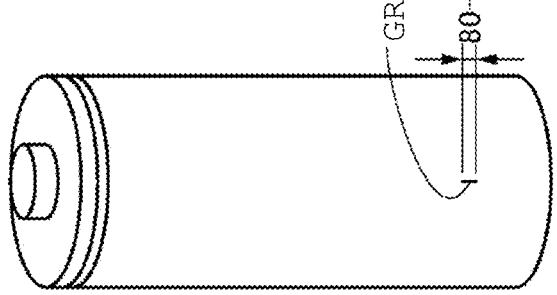

As shown in FIG. 12A, a battery in each of Examples 9-1 and 9-2 was obtained in the same manner as in Examples 1-1 and 1-2, respectively, except for using a battery can provided with one groove that extended over a range of 80% or more and 83% or less from one end on the top side of the outer circumferential surface.

EXAMPLES 10-1, 10-2

As shown in FIG. 12B, a battery in each of Examples 10-1 and 10-2 was obtained in the same manner as in Examples 1-1 and 1-2, respectively, except for using a battery can provided with one groove that extended over a range of 17% or more and 20% or less from one end on the top side of the outer circumferential surface.

Comparative Examples 1-1, 1-2

A battery in each of Comparative Examples 1-1 and 1-2 was obtained in the same manner as in Examples 1-1 and 1-2, respectively, except for using a battery can that was not provided with a groove on the outer circumferential surface.

Comparative Examples 2-1, 2-2

The ratio between the average outer diameter and the average hole diameter (average inner diameter) of the wound electrode body of each of Comparative Examples 2-1 and 2-2 was set so that average outer diameter:average pore diameter=100:21 ($\phi$:3.6 mm). That is, the ratio (($r/R$)×100) of the average hole diameter (average inner diameter) r of the wound electrode body to the average outer diameter R of the wound electrode body was set to 21.0%. A battery in each of Comparative Examples 2-1 and 2-2 was obtained in the same manner as in Examples 1-1 and 1-2, respectively, except for this.

Comparative Examples 3-1, 3-2

As shown in FIG. 12C, a battery in each of Comparative Examples 3-1 and 3-2 was obtained in the same manner as in Examples 1-1 and 1-2, respectively, except for using a battery can provided with one groove that extended over a range of 0% or more and 100% or less from one end on the top side of the outer circumferential surface.

Comparative Examples 4-1, 4-2

As shown in FIG. 12D, a battery in each of Comparative Examples 4-1 and 4-2 was obtained in the same manner as in Examples 1-1 and 1-2, respectively, except for using a battery can provided with one groove that extended over a range of 30% or more and 70% or less from one end on the top side of the outer circumferential surface.

Comparative Examples 5-1, 5-2

Figures 13A, 13B, 13C, 13D:
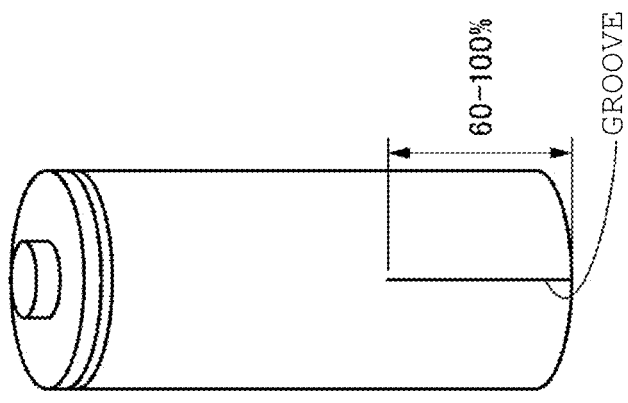
FIGS. 13A, 13B, 13C and 13D are each a schematic view for explaining formation positions of grooves with respect to the circumferential surface according to an embodiment.

As shown in FIG. 13A, a battery in each of Comparative Examples 5-1 and 5-2 was obtained in the same manner as in Examples 1-1 and 1-2, respectively, except for using a battery can provided with one groove that extended over a range of 20% or more and 40% or less from one end on the top side of the outer circumferential surface.

Comparative Examples 6-1, 6-2

As shown in FIG. 13B, a battery in each of Comparative Examples 6-1 and 6-2 was obtained in the same manner as in Examples 1-1 and 1-2, respectively, except for using a battery can provided with one groove that extended over a range of 60% or more and 80% or less from one end on the top side of the outer circumferential surface.

Comparative Examples 7-1, 7-2

As shown in FIG. 13C, a battery in each of Comparative Examples 7-1 and 7-2 was obtained in the same manner as in Examples 1-1 and 1-2, respectively, except for using a battery can provided with one groove that extended over a range of 0% or more and 40% or less from one end on the top side of the outer circumferential surface.

Comparative Examples 8-1, 8-2

As shown in FIG. 13D, a battery in each of Comparative Examples 8-1 and 8-2 was obtained in the same manner as in Examples 1-1 and 1-2, respectively, except for using a battery can provided with one groove that extended over a range of 60% or more and 100% or less from one end on the top side of the outer circumferential surface.

The batteries of Examples 1-1 to 10-2 and Comparative Examples 1-1 to 8-2 obtained as described above were subjected to the following test of dropping into fire and cycle test. These tests conform to the public test method.

After 10 batteries were overcharged to 4.5 V, they were dropped into fire, and the number of batteries whose contents splashed out or released from the battery was counted. The batteries of Examples 1-1 to 10-2 and Comparative Examples 1-1 to 8-2 were designed to be fully charged at 4.2 V in general.

Each of the batteries was subjected to a cycle test of charge at 1 C and discharge at 1 C, and it was confirmed how many cycles tear occurred in the battery can. Herein, "charge at 1 C" is a current value at which a battery capacity (theoretical capacity) is fully charged in 1 hour, and "discharge at 1 C" is a current value at which a battery capacity (theoretical capacity) is fully discharged in 1 hour.

Table 1 shows the configurations and evaluation results of the batteries of Examples 1-1 to 10-2 and Comparative Examples 1-1 to 8-2.

TABLE 1

| | (r/R) × 100 (%) | Presence or Absence of Center Pin | Range of Groove Formation (mm) | Number of Grooves | (L/H) × 100 (%) | Test Result (n/N) | Presence or Absence of Can Tearing in Cycle Test |
|---|---|---|---|---|---|---|---|
| Example 1-1 | 12.5 | Present | 70-100 (FIG. 10A) | 1 | 30 | 1/10 | No Tear after 500 Cycles |
| Example 1-2 | 12.5 | None | 70-100 (FIG. 10A) | 1 | 30 | 1/10 | No Tear after 500 Cycles |
| Example 2-1 | 12.5 | Present | 0-30 (FIG. 10B) | 1 | 30 | 0/10 | No Tear after 500 Cycles |
| Example 2-2 | 12.5 | None | 0-30 (FIG. 10B) | 1 | 30 | 2/10 | No Tear after 500 Cycles |
| Example 3-1 | 12.5 | Present | 70-100 (FIG. 10C) | 4 | 30 | 0/10 | No Tear after 500 Cycles |
| Example 3-2 | 12.5 | None | 70-100 (FIG. 10C) | 4 | 30 | 0/10 | No Tear after 500 Cycles |

TABLE 1-continued

| | (r/R) × 100 (%) | Presence or Absence of Center Pin | Range of Groove Formation (mm) | Number of Grooves | (L/H) × 100 (%) | Test Result (n/N) | Presence or Absence of Can Tearing in Cycle Test |
|---|---|---|---|---|---|---|---|
| Example 4-1 | 12.5 | Present | 0-30 (FIG. 10D) | 4 | 30 | 0/10 | No Tear after 500 Cycles |
| Example 4-2 | 12.5 | None | 0-30 (FIG. 10D) | 4 | 30 | 0/10 | No Tear after 500 Cycles |
| Example 5-1 | 12.5 | Present | 0-30, 70-100 in straight line (FIG. 11A) | 2 | 30 | 0/10 | No Tear after 500 Cycles |
| Example 5-2 | 12.5 | None | 0-30, 70-100 in straight line (FIG. 11A) | 2 | 30 | 0/10 | No Tear after 500 Cycles |
| Example 6-1 | 12.5 | Present | 0-30, 70-100 position displaced with respect to each other (FIG. 11B) | 2 | 30 | 0/10 | No Tear after 500 Cycles |
| Example 6-2 | 12.5 | None | 0-30, 70-100 position displaced with respect to each other (FIG. 11B) | 2 | 30 | 0/10 | No Tear after 500 Cycles |
| Example 7-1 | 12.5 | Present | 75-95 (FIG. 11C) | 1 | 20 | 1/10 | No Tear after 500 Cycles |
| Example 7-2 | 12.5 | None | 75-95 (FIG. 11C) | 1 | 20 | 0/10 | No Tear after 500 Cycles |
| Example 8-1 | 12.5 | Present | 5-25 (FIG. 11D) | 1 | 20 | 1/10 | No Tear after 500 Cycles |
| Example 8-2 | 12.5 | None | 5-25 (FIG. 11D) | 1 | 20 | 2/10 | No Tear after 500 Cycles |
| Example 9-1 | 12.5 | Present | 80-83 (FIG. 12A) | 1 | 3 | 3/10 | No Tear after 500 Cycles |
| Example 9-2 | 12.5 | None | 80-83 (FIG. 12A) | 1 | 3 | 4/10 | No Tear after 500 Cycles |
| Example 10-1 | 12.5 | Present | 17-20 (FIG. 12B) | 1 | 3 | 4/10 | No Tear after 500 Cycles |
| Example 10-2 | 12.5 | None | 17-20 (FIG. 12B) | 1 | 3 | 3/10 | No Tear after 500 Cycles |
| Comparative Example 1-1 | 12.5 | Present | None | 0 | — | 6/10 | No Tear after 500 Cycles |
| Comparative Example 1-2 | 12.5 | None | None | 0 | — | 7/10 | No Tear after 500 Cycles |
| Comparative Example 2-1 | 21.0 | Present | None | 0 | — | 0/10 | No Tear after 500 Cycles |
| Comparative Example 2-2 | 21.0 | None | None | 0 | — | 0/10 | No Tear after 500 Cycles |
| Comparative Example 3-1 | 12.5 | Present | 0-100 (FIG. 12C) | 1 | 100 | 0/10 | Tear in 100 Cycles |
| Comparative Example 3-2 | 12.5 | None | 0-100 (FIG. 12C) | 1 | 100 | 0/10 | Tear in 150 Cycles |
| Comparative Example 4-1 | 12.5 | Present | 30-70 (FIG. 12D) | 1 | 40 | 0/10 | Tear in 100 Cycles |
| Comparative Example 4-2 | 12.5 | None | 30-70 (FIG. 12D) | 1 | 40 | 1/10 | Tear in 150 Cycles |
| Comparative Example 5-1 | 12.5 | Present | 20-40 (FIG. 13A) | 1 | 20 | 1/10 | Tear in 250 Cycles |
| Comparative Example 5-2 | 12.5 | None | 20-40 (FIG. 13A) | 1 | 20 | 0/10 | Tear in 200 Cycles |
| Comparative Example 6-1 | 12.5 | Present | 60-80 (FIG. 13B) | 1 | 20 | 1/10 | Tear in 200 Cycles |
| Comparative Example 6-2 | 12.5 | None | 60-80 (FIG. 13B) | 1 | 20 | 1/10 | Tear in 250 Cycles |
| Comparative Example 7-1 | 12.5 | Present | 0-40 (FIG. 13C) | 1 | 40 | 0/10 | Tear in 200 Cycles |
| Comparative Example 7-1 | 12.5 | None | 0-40 (FIG. 13C) | 1 | 40 | 0/10 | Tear in 250 Cycles |
| Comparative Example 8-1 | 12.5 | Present | 60-100 (FIG. 13D) | 1 | 40 | 0/10 | Tear in 200 Cycles |
| Comparative Example 8-2 | 12.5 | None | 60-100 (FIG. 13D) | 1 | 40 | 0/10 | Tear in 250 Cycles |

In Table 1, symbols r, R, L, H, n and N indicate the following means.
- r: Average hole diameter (diameter) of wound electrode body
- R: Average outer diameter (diameter) of wound electrode body
- L: Length of groove (thin wall part)
- H: Height (width) of circumferential surface of battery can
- n: Number of samples whose contents splash out in test of dropping into fire
- N: Total number of samples subjected to test of dropping into fire In the batteries (Comparative Examples 2-1 and 2-2) in which the ratio of the average hole diameter r of the center hole to the average outer diameter R of the wound electrode body is 21.0% (Φ:3.6 mm), there is no explosion, and the contents do not splash out. On the contrary, in the batteries (Comparative Examples 1-1 and 1-2) in which the ratio is 12.5% (Φ:2.2 mm), the contents splash out or release at a rate of about 60%.

In the batteries in which one thin wall part is provided over a range of 70% or more and 100% or less (FIG. 10A, Examples 1-1 and 1-2) or a range of 0% or more and 30% or less (FIG. 10B, Examples 2-1 and 2-2) from one end on the top side of the outer circumferential surface of the battery can, the rate at which the contents of the batteries splash out is lowered.

In the batteries in which a plurality of thin wall parts are provided in a range of 70% or more and 100% or less from one end on the top side of the outer circumferential surface of the battery can, the rate at which the contents of the batteries splash out can be made lowered (FIG. 10C, Examples 3-1, 3-2) as compared with the batteries in which one thin wall part is provided in the same range.

In the batteries in which a plurality of thin wall parts are provided in a range of 0% or more and 30% or less from one end on the top side of the outer circumferential surface of the battery can, the rate at which the contents of the batteries splash out can be made lowered (FIG. 10D, Examples 4-1 and 4-2) as compared with the batteries in which one thin wall part is provided in the same range.

In the batteries in which a thin wall part is provided in both of a range of 0% or more and 30% or less and a range of 70% or more and 100% or less from one end on the top side of the outer circumferential surface, the rate at which the contents of the batteries splash out can be made lowered (FIGS. 11A and 11B, Examples 5-1 to 6-2) as compared with the batteries in which a thin wall part is provided in any one of the both ranges described above. Further, in the case of adopting a configuration in which a thin wall part is provided in both of the above ranges, a similar effect is obtained regardless of whether the thin wall parts provided in both ranges are positioned in the same straight line extending in a height direction of the battery can (FIGS. 11A and 11B, Examples 5-1 to 6-2).

Even in the batteries in which the ratio of the length L of the thin wall part to the height (width) H of the circumferential surface is less than 30%, splashing out of the contents can be suppressed (FIGS. 11C to 12B, Examples 7-1 To 10-2). However, when the ratio is less than 5%, since the length of the thin wall part is short and the gas discharge amount is insufficient, the splashing out of the contents of the battery occurs at a rate of about 30% (FIGS. 12A and 12B, Examples 9-1 to 10-2).

In the batteries in which a thin wall part is provided over the central portion (specifically, a range of 30% or more and 70% or less from one end on the top side of the outer circumferential surface) of the outer circumferential surface of the battery can, tear occurs in the battery can in relatively small number of cycles, resulting in loss of the hermeticity of the batteries (FIG. 12C, FIG. 12D, Comparative Examples 3-1 to 4-2).

Even in the batteries in which a part of a thin wall part covers the central portion of the outer circumferential surface of the battery can, tear occurs in the battery can in relatively small number of cycles, resulting in loss of the hermeticity of the batteries (FIGS. 13A to 13D, Comparative Examples 5-1 to 8-2).

On the other hand, in the batteries in which the thin wall part is provided in both end portions of the outer circumferential surface (specifically, the range of 0% or more and 30% or less or 70% or more and 100% or less from one end on the top side of the outer circumferential surface) of the battery can, tear does not occur in the battery can even after 500 cycles of tests (FIGS. 10A to 12B, Examples 1-1 to 10-2).

The thin wall part is provided in one or both of the regions in the range of 0% or more and 30% or less and the range of 70% or more and 100% or less from one end on the top side of the battery circumferential surface, the occurrence of tear of the battery can during a charge-discharge cycle can be suppressed and the scattering of the contents of the battery can be suppressed.

From the viewpoint of suppressing the scattering of the contents of the battery, the ratio ((L/H)×100) of the length L of the thin wall part to the height (width) H of the circumferential surface is preferably 5% to 30%.

Although the embodiments of the present technology, and their modifications and examples have been specifically described above, the present technology is not limited to the above embodiments, modifications thereof and examples, and various modifications based on the technical idea of the present technology may be made.

For example, the configurations, methods, steps, shapes, materials, numerical values and the like described in the above embodiments, and modifications thereof and examples are merely examples, and configurations, methods, steps, shapes, materials and numerical values different from those described above may be employed as required.

Further, the configurations, methods, steps, shapes, materials, numerical values and the like in the above-mentioned embodiments, and modifications thereof and examples may be combined with one another without departing from the gist of the present technology.

Further, an example in which the present technology is applied to a lithium ion secondary battery has been described, but it should be appreciated and understood that the present technology can also be applied to a secondary battery other than a lithium ion secondary battery and a primary battery.

In the embodiment described above, an example has been described in which the present technology is applied to a battery having a drawn portion and a circumferential surface provided in a range from the drawing portion to the bottom portion of a battery can; however, the present technology is not limited to the example and is applicable to a battery as long as it is a battery including a cylindrical can as a battery can.

Further, the present technology is described below in further detail according to an embodiment.

(1)

A battery including:
a power generation element having a through hole; and
a cylindrical can housing the power generation element and having at least one thin wall part on a circumferential surface of the cylindrical can,
in which
a ratio of an average hole diameter of the through hole to an average outside diameter of the power generation element is 17% or less, and
the thin wall part is provided in one or both of regions in a range from 0% to 30% and a range from 70% to 100% from an end of the circumferential surface.

(2)

The battery according to the above (1), in which a ratio of a length of the thin wall part to a height of the circumferential surface is 5% or more and 30% or less.

(3)

The battery according to the above (1) or (2), in which a ratio of a thickness of the thin wall part to a thickness of the cylindrical can is 1% or more and 90% or less.

(4)

The battery according to the above (3), in which the ratio of the thickness of the thin wall part to the thickness of the cylindrical can is 10% or more and 80% or less.

(5)

The battery according to any one of the above (1) to (4), in which a ratio of a width of the thin wall part to an outer diameter of the cylindrical can is 16% or less.

(6)

The battery according to the above (5), in which the ratio of the width of the thin wall part to the outer diameter of the cylindrical can is 8% or less.

(7)
  The battery according to any one of the above (1) to (6), in which the thin wall part extends substantially in parallel with a central axis of the cylindrical can or extends in an angle within 10° with the center axis of the battery can.
(8)
  The battery according to any one of the above (1) to (7), in which one or both of the regions in the range of 0% or more and 30% or less and the range of 70% or more and 100% or less from one end of the circumferential surface include two or more thin wall parts.
(9)
  The battery according to any one of the above (1) to (8), in which one or both of the regions in the range of 0% or more and 30% or less and the range of 70% or more and 100% or less from one end of the circumferential surface include three or more of the thin wall parts, and the three or more thin wall parts are disposed at equal intervals in a circumferential direction of the circumferential surface.
(10)
  The battery according to any one of the above (1) to (8), in which one or both of the regions in the range of 0% or more and 30% or less and the range of 70% or more and 100% or less from one end of the circumferential surface include three or more of the thin wall parts, and an angle between line segments connecting the thin wall parts adjacent to each other and the center axis of the cylindrical can is in a range of 110° or more and 120° or less.
(11)
  The battery according to any one of the above (1) to (10), further including a safety valve that releases a gas when the gas is produced in the cylindrical can, in which a gas release pressure of the thin wall part is higher than a gas release pressure of the safety valve.
(12)
  The battery according to any one of the above (1) to (11), in which the battery element includes a positive electrode containing a positive electrode active material having average composition represented by formula (1) below:

$$Li_vNi_wM'_xM''_yO_z \quad (1)$$

(In the above formula, $0<v<2$, $w+x+y\leq1$, $0<w\leq1$, $0\leq x\leq0.5$, $0\leq y\leq0.5$, and $0<z<3$, and M' and M'' are each selected from Co (cobalt), Fe (iron), Mn (manganese), Cu (copper), Zn (zinc), Al (aluminum), Cr (chromium), V (vanadium), Ti (titanium), Mg (magnesium), Zr (zirconium) and combinations thereof).
(13)
  The battery according to any one of the above (1) to (12), in which the thin wall part includes a groove or a plane portion.
(14)
  The battery according to any one of the above (1) to (13), in which the circumferential surface is provided in a range from a drawn portion to a bottom portion of the cylindrical can.
(15)
  A battery pack including:
  the battery according to any one of the above (1) to (14); and
  a control circuit configured to control the battery.
(16)
  An electronic device including the battery according to any one of the above (1) to (14),
  in which the electronic device is configured to receive supply of electric power from the battery.
(17)
  A battery pack including:
  the battery according to any one of the above (1) to (14);
  a converting device configured to receive supply of electric power from the battery and convert the electric power into a driving force of a vehicle; and
  a control circuit configured to perform information processing on vehicle control based on information on the battery.
(18)
  An electronic storage device including the battery according to any one of the above (1) to (14),
  in which the electric storage device is configured to supply electric power to an electronic device connected to the battery.
(19)
  The electric storage device according to the above (18), in which
  the electric storage device includes an electric power information control circuit which transmits and receives a signal to and from another device via a network, and
  charge-discharge control of the battery is performed based on information received by the electric power information control circuit.
(20)
  An electric power system including the battery according to any one of the above (1) to (14),
  in which the electric power system is configured to receive supply of electric power from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery comprising:
  a power generation element having a through hole; and
  a cylindrical can housing the power generation element and having at least one thin wall part on a circumferential surface of the cylindrical can,
  wherein a ratio of an average hole diameter of the through hole to an average outside diameter of the power generation element is 17% or less, and
  wherein the thin wall part has a thickness less than the cylindrical can, and wherein the thin wall part is provided in at least a region in a first range from 0% to 30% and a second range from 70% to 100% of the circumferential surface, and wherein 0% represents a first position on an end of the circumferential surface and 100% represents a second position on an opposite end of the circumferential surface.
2. The battery according to claim 1, wherein a ratio of a length of the thin wall part to a height of the circumferential surface is 5% or more and 30% or less.
3. The battery according to claim 1, wherein a ratio of a thickness of the thin wall part to a thickness of the cylindrical can is 1% or more and 90% or less.

4. The battery according to claim 3, wherein the ratio of the thickness of the thin wall part to the thickness of the cylindrical can is 10% or more and 80% or less.

5. The battery according to claim 1, wherein a ratio of a width of the thin wall part to an outer diameter of the cylindrical can is 16% or less.

6. The battery according to claim 5, wherein the ratio of the width of the thin wall part to the outer diameter of the cylindrical can is 8% or less.

7. The battery according to claim 1, wherein the thin wall part extends substantially in parallel with a central axis of the cylindrical can or extends in an angle within 10° with the center axis of the battery can.

8. The battery according to claim 1, wherein one or both of the regions include two or more of the thin wall parts.

9. The battery according to claim 1, wherein one or both of the regions include three or more thin wall parts, and wherein the three or more thin wall parts are disposed at equal intervals on the circumferential surface.

10. The battery according to claim 1, wherein one or both of the regions include three or more thin wall parts, and wherein an angle between line segments connecting the thin wall parts adjacent to each other and a center axis of the cylindrical can is in a range of 110° or more and 120° or less.

11. The battery according to claim 1, further comprising a safety valve configured to release a gas when the gas is produced in the cylindrical can, wherein
a gas release pressure of the thin wall part is higher than a gas release pressure of the safety valve.

12. The battery according to claim 1, wherein the battery element includes a positive electrode containing a positive electrode active material including a composition represented by formula (1) below:

$$Li_v Ni_w M'_x M''_y O_z \quad (1)$$

wherein $0<v<2$, $w+x+y\leq1$, $0<w\leq1$, $0\leq x\leq0.5$, $0\leq y\leq0.5$, and $0<z<3$, and M' and M'' are each selected from the group consisting of Co (cobalt), Fe (iron), Mn (manganese), Cu (copper), Zn (zinc), Al (aluminum), Cr (chromium), V (vanadium), Ti (titanium), Mg (magnesium), Zr (zirconium) and combinations thereof.

13. The battery according to claim 1, wherein the thin wall part includes a groove or a plane portion.

14. The battery according to claim 1, wherein the circumferential surface is provided in a range from a drawn portion to a bottom portion of the cylindrical can.

15. A battery pack comprising:
the battery according to claim 1; and
a control circuit configured to control the battery.

16. An electronic device comprising the battery according to claim 1,
wherein the electronic device is configured to receive a supply of electric power from the battery.

17. An electric vehicle comprising:
the battery according to claim 1;
a converting device configured to receive a supply of electric power from the battery and convert the electric power into a driving force of a vehicle; and
a control circuit configured to perform information processing on vehicle control based on information on the battery.

18. An electric storage device comprising the battery according to claim 1,
wherein the electric storage device is configured to supply electric power to an electronic device connected to the battery.

19. The electric storage device according to claim 18, wherein
the electric storage device includes an electric power information control circuit which transmits and receives a signal to and from a device via a network, and
charge-discharge control of the battery is performed based on information received by the electric power information control circuit.

20. An electric power system comprising the battery according to claim 1,
wherein the electric power system is configured to receive a supply of electric power from the battery.

* * * * *